United States Patent
Semenov et al.

(10) Patent No.: US 12,392,042 B2
(45) Date of Patent: Aug. 19, 2025

(54) ALTERNATING CURRENT (AC) TRANSITION-METAL CATALYSIS

(71) Applicant: YEDA RESEARCH AND DEVELOPMENT CO. LTD., Rehovot (IL)

(72) Inventors: Sergey N. Semenov, Rehovot (IL); Evgenii Bortnikov, Rehovot (IL)

(73) Assignee: Yeda Research and Development Co. Ltd., Rehovot (IL)

( * ) Notice: Subject to any disclaimer, the term of this patent is extended or adjusted under 35 U.S.C. 154(b) by 0 days.

(21) Appl. No.: 18/043,339

(22) PCT Filed: Sep. 14, 2021

(86) PCT No.: PCT/IL2021/051129
§ 371 (c)(1),
(2) Date: Feb. 28, 2023

(87) PCT Pub. No.: WO2022/059010
PCT Pub. Date: Mar. 24, 2022

(65) Prior Publication Data
US 2023/0407492 A1 Dec. 21, 2023

(30) Foreign Application Priority Data
Sep. 15, 2020 (IL) .......................... 277384

(51) Int. Cl.
C25B 3/29 (2021.01)
B01J 31/18 (2006.01)
(Continued)

(52) U.S. Cl.
CPC ............. *C25B 3/29* (2021.01); *B01J 31/1805* (2013.01); *C25B 3/03* (2021.01); *C25B 3/07* (2021.01); *C25B 3/09* (2021.01); *C25B 3/11* (2021.01); *C25B 9/17* (2021.01); *C25B 11/042* (2021.01); *B01J 2231/4277* (2013.01)

(58) Field of Classification Search
None
See application file for complete search history.

(56) References Cited

U.S. PATENT DOCUMENTS

| 4,096,052 A | 6/1978 | Weinberg |
| 2008/0039342 A1 | 2/2008 | Tian et al. |

(Continued)

FOREIGN PATENT DOCUMENTS

| EP | 0831156 A1 | 3/1998 |
| WO | WO 2016/196931 A1 | 12/2016 |

OTHER PUBLICATIONS

Bartlett et al. "A reinvestigation of the electrochemistry of [Ni (II) (bpy) 3 (ClO) 4) 2] in acetonitrile using rotating disc and rotating ring-disc electrodes" Electrochimica acta. Dec. 1, 1993;38(17):2515-23.

(Continued)

*Primary Examiner* — Wojciech Haske
(74) *Attorney, Agent, or Firm* — Mark S. Cohen; PEARL COHEN ZEDEK LATZER BARATZ LLP

(57) ABSTRACT

This invention provides a catalytic process wherein alternating current is used for catalytic coupling (such as C—C, C—N, C—O, C—S, C—P, C—Si and/or C—B couplings) using a transition-metal catalysis.

18 Claims, 20 Drawing Sheets

(51) Int. Cl.
    *C25B 3/03*     (2021.01)
    *C25B 3/07*     (2021.01)
    *C25B 3/09*     (2021.01)
    *C25B 3/11*     (2021.01)
    *C25B 9/17*     (2021.01)
    *C25B 11/042*     (2021.01)

(56) References Cited

U.S. PATENT DOCUMENTS

| | | | |
|---|---|---|---|
| 2016/0010225 A1 | 1/2016 | Dyballa et al. | |
| 2016/0097134 A1* | 4/2016 | Azad | C25B 11/043 548/215 |
| 2020/0148668 A1 | 5/2020 | Macmillan et al. | |
| 2020/0385333 A1* | 12/2020 | Wu | C25B 3/09 |
| 2021/0207274 A1* | 7/2021 | Luo | C25B 3/29 |

OTHER PUBLICATIONS

Bortnikov et al. "Coupling of alternating current to transition-metal catalysis: examples of nickel-catalyzed cross-coupling" The Journal of Organic Chemistry. Nov. 13, 2020;86(1):782-93.

Budnikova et al. "Highly reactive o-organonickel complexes in electrocatalytic processes" Journal of Organometallic Chemistry. Jul. 9, 2001;630(2):185-92.

Cannes et al. "Nickel-catalyzed electrochemical homocoupling of alkenyl halides: rates and mechanisms" Journal of Electroanalytical Chemistry. Aug. 29, 1996;412(1-2):85-93.

Cavedon et al. "Semiheterogeneous dual nickel/photocatalytic (thio) etherification using carbon nitrides" Organic letters. Jun. 24, 2019;21(13):5331-4.

Corcoran et al. "Aryl amination using ligand-free Ni (II) salts and photoredox catalysis" Science. Jul. 15, 2016;353(6296):279-83.

Derien et al. "From stoichiometry to catalysis: electroreductive coupling of alkynes and carbon dioxide with nickel-bipyridine complexes. Magnesium ions as the key for catalysis" Journal of the American Chemical Society. Oct. 1991;113(22):8447-54.

Durandetti et al. "Investigation of the Reductive Coupling of Aryl Halides AND". New journal of chemistry. 1996;20(6):659-67.

Escobar et al. "A Unified and Practical Method for Carbon-Heteroatom Cross-Coupling Using Nickel/Photo Dual Catalysis" Chemistry—A European Journal. Apr. 21, 2020;26(23):5168-73.

Hartwig et al. "Room-temperature palladium-catalyzed amination of aryl bromides and chlorides and extended scope of aromatic C—N bond formation with a commercial ligand" The Journal of organic chemistry. Jul. 23, 1999;64(15):5575-80.

International Search Report for PCT Application No. PCT/IL2021/051129 dated Jan. 4, 2022.

Jack et al. "The merger of transition metal and photocatalysis" Nature Reviews. Chemistry. Jul. 1, 2017;1(7).

Jiang et al. "Copper-Catalyzed Cyanation of Aryl Iodides with Malononitrile: An Unusual Cyano Group Transfer Process from C (sp3) to C (sp2)" Advanced Synthesis & Catalysis. Mar. 2012;354(4):589-92.

Johnston et al. "Metallaphotoredox-catalysed sp 3-sp 3 cross-coupling of carboxylic acids with alkyl halides" Nature. Aug. 18, 2016;536(7616):322-5.

Kawamata et al. "Electrochemically driven, Ni-catalyzed aryl amination: scope, mechanism, and applications" Journal of the American Chemical Society. Mar. 24, 2019;141(15):6392-402.

Keaveney et al. "Palladium-Catalyzed Decarbonylative Trifluoromethylation of Acid Fluorides" Angewandte Chemie. Apr. 3, 2018;130(15):4137-41.

Klein et al. "Electron transfer in organonickel complexes of α-dilmines: Versatile redox catalysts for C—C or C—P coupling reactions—A review" Journal of organometallic chemistry. Jul. 1, 2007;692(15):3156-66.

Lee et al. "Alternating-current electrolysis for the production of phenol from benzene" Angewandte Chemie (International ed. in English). Jun. 8, 2012;51(28):6961-5.

Levin et al. "Photoredox catalysis unlocks single-electron elementary steps in transition metal catalyzed cross-coupling" ACS central science. May 25, 2016;2(5):293-301.

Li et al. "Electrochemically enabled, nickel-catalyzed amination" Angewandte Chemie. Oct. 9, 2017;129(42):13268-73.

Lim et al. "C—N cross-coupling via photoexcitation of nickel-amine complexes" Journal of the American Chemical Society. May 22, 2018;140(24):7667-73.

Lin et al. "Photo-driven redox-neutral decarboxylative carbon-hydrogen trifluoromethylation of (hetero) arenes with trifluoroacetic acid" Nature Communications. Feb. 6, 2017;8(1):14353.

Lu et al. "Palladium-Catalyzed Cyanation of Aryl Bromides with Malononitrile via Carbon-Nitrile Bond Cleavage Mediated by Copper" Synlett. Mar. 2014;25(04):547-50.

Mills et al. "Ni-catalyzed reductive cyanation of aryl halides and phenol derivatives via transnitrilation" Journal of the American Chemical Society. Nov. 11, 2019;141(49):19257-62.

Mo et al. "Microfluidic electrochemistry for single-electron transfer redox-neutral reactions" Science. Jun. 19, 2020;368(6497):1352-7.

Morimoto et al. "A broadly applicable copper reagent for trifluoromethylations and perfluoroalkylations of aryl iodides and bromides" Angewandte Chemie. Apr. 11, 2011;123(16):3877-82.

Park et al. "Visible light-mediated (hetero) aryl amination using Ni (II) salts and photoredox catalysis in flow: a synthesis of Tetracaine" The Journal of Organic Chemistry. Jan. 2, 2020;85(5):3234-44.

Pieber et al. "Semi-heterogeneous Dual Nickel/Photocatalysis using Carbon Nitrides: Esterification of Carboxylic Acids with Aryl Halides" Angewandte Chemie International Edition. Jul. 8, 2019:58(28):9575-80.

Qi et al. "Dual role of a photocatalyst: generation of Ni (0) catalyst and promotion of catalytic C—N bond formation" ACS Catalysis. Feb. 2, 2018;8(2):1456-63.

Rodrigo et al. "Alternating current electrolysis for organic electrosynthesis: trifluoromethylation of (hetero) arenes" Organic Letters. Jul. 13, 2020;22(17):6719-23.

Sattler et al. "Alternating current electrolysis for the electrocatalytic synthesis of mixed disulfide via sulfur-sulfur bond metathesis towards dynamic disulfide libraries" Chemistry—A European Journal. Mar. 9, 2020;26(14):3129-36.

Sengmany et al. "A mild electroassisted synthesis of (hetero) arylphosphonates" Organic & Biomolecular Chemistry. 2018;16(24):4495-500.

Sun et al. "General Paradigm in Photoredox Nickel-Catalyzed Cross-Coupling Allows for Light-Free Access to Reactivity" Angewandte Chemie. Jun. 8, 2020;132(24):9614-20.

Sun et al. "Elucidation of a redox-mediated reaction cycle for nickel-catalyzed cross coupling" Journal of the American Chemical Society. Dec. 18, 2018;141(1):89-93.

Tasker et al. "Recent advances in homogeneous nickel catalysis" Nature. May 15, 2014;509(7500):299-309.

Terrett et al. "Switching on elusive organometallic mechanisms with photoredox catalysis" Nature. Aug. 20, 2015,524(7565):330-4.

Tian et al. "Electrochemically assisted Heck reactions" Organic Letters. Nov. 24, 2005;7(24):5381-3.

Tian et al. "Transient absorption spectroscopy offers mechanistic insights for an iridium/nickel-catalyzed C—O coupling" Journal of the American Chemical Society. Feb. 20, 2020;142(10):4555-9.

Tobisu et al. "Ni0-catalyzed direct amination of anisoles involving the cleavage of carbon-oxygen bonds" Chemistry letters. Jul. 5, 2009;38(7):710-1.

Troupel et al. "Electrochemistry of Nickel-Complexes Associated with 2, 2'-Bipyridine in the N-Methylpyrrolidone Solvent-Application to Activation of Carbon-Halogen Bonds" Nouveau Journal De Chimie—New Journal of Chemistry. Nov. 1, 1986;10(11):593-9.

Tyson et al. "Sniffers, buzzers, toggles and blinkers: dynamics of regulatory and signaling pathways in the cell" Current opinion in cell biology. Apr. 1, 2003;15(2):221-31.

Ueda et al. "Nickel-catalyzed cyanation of aryl halides and triflates using acetonitrile via C—CN bond cleavage assisted by 1, 4-bis (trimethylsilyl)-2, 3, 5, 6-tetramethyl-1, 4-dihydropyrazine" Chemical Science. Jan. 23, 2019;10(4):994-9.

(56) References Cited

OTHER PUBLICATIONS

Wang et al. "Electrochemically promoted nickel-catalyzed carbon-sulfur bond formation" ACS Catalysis. Jan. 25, 2019;9(3):1630-4.

Welin et al. "Photosensitized, energy transfer-mediated organometallic catalysis through electronically excited nickel (II)" Science. Jan. 27, 2017;355(6323):380-5.

Yakhvarov et al. "Electrochemical synthesis of the o-aryl complex [NiBr(Mes)(bpy)] and its use as catalyst precursor for the oligomerization of ethylene (Mes=2, 4, 6-trimethylphenyl, bpy=2, 2'-bipyridine)" Polyhedron. May 8, 2006;25(7):1607-12.

Yang et al. "Amination of aromatic halides and exploration of the reactivity sequence of aromatic halides" The Journal of Organic Chemistry. Dec. 17, 2018;84(1):181-90.

Yang et al. "Light-Promoted Nickel Catalysis: Etherification of Aryl Electrophiles with Alcohols Catalyzed by a NiII-Aryl Complex" Angewandte Chemie International Edition. Jul. 27, 2020;59(31):12714-9.

Yu et al. "Nickel-Catalyzed Cyanation of Aryl Chlorides and Triflates Using Butyronitrile: Merging Retro-hydrocyanation with Cross-Coupling" Angewandte Chemie. Dec. 4, 2017;129(49):15899-903.

Zhu et al. "Ir III/Ni II-Metallaphotoredox catalysis: the oxidation state modulation mechanism versus the radical mechanism"\ Chemical Communications. 2018;54(47):5968-71.

Zhu et al. "Visible light driven, nickel-catalyzed aryl esterification using a triplet photosensitiser thioxanthen-9-one" Organic Chemistry Frontiers. 2019;6(14):2353-9.

Zuo et al. "Merging photoredox with nickel catalysis: Coupling of α-carboxyl sp3-carbons with aryl halides" Science. Jul. 25, 2014;345(6195):437-40.

\* cited by examiner

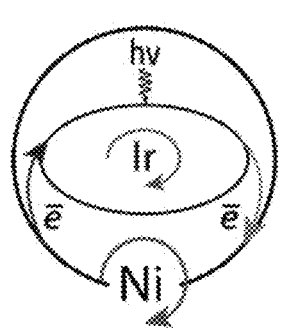
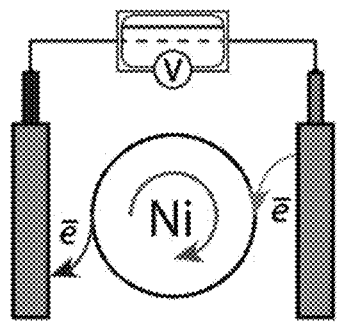
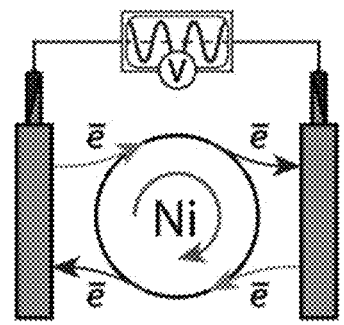
Photoredox-assisted coupling
FIGURE 1A
DC-assisted coupling
FIGURE 1B
*This work:* AC-assisted coupling
FIGURE 1C
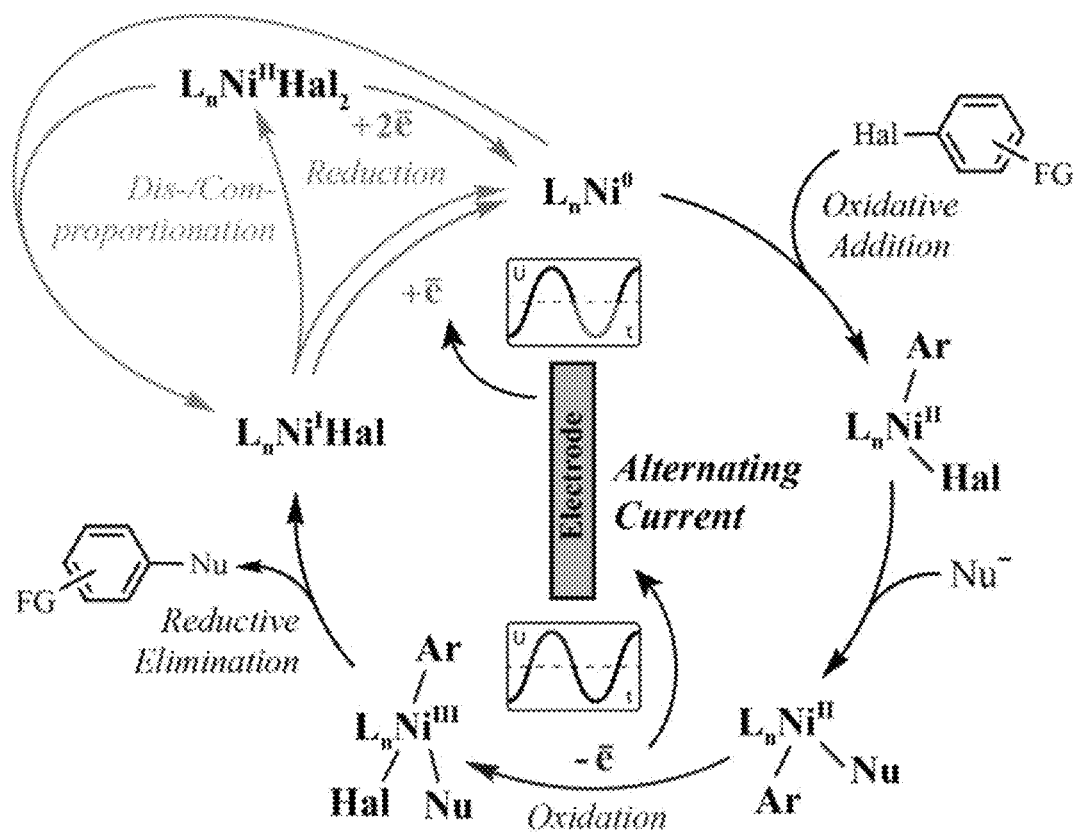
FIGURE 1D

| Deviations from initial conditions | | NMR yield |
|---|---|---|
| None | | 80% |
| Ligand | 10 mol% Bipy | 79% |
| Sup. electrolyte | 0.1M Bu$_4$NBr | 53% |
| | 0.2M LiCl | 16% |
| Frequency | 0.1 Hz | 55% |
| | 0.5 Hz | 82% |
| | 2 Hz | 87% |
| | 10 Hz | 78% |
| | 25 Hz | 48% |
| DC | 2.8V | 56% |
| No current | | 0% |

*Initial conditions*

| Deviations from initial conditions | | NMR yield |
|---|---|---|
| None | | 71% |
| Base | 1.5 eq. Quinuclidine | 22% |
| | 1.5 eq. $^t$BuOK | 45% |
| | 10 eq. $K_3PO_4$ | 64% |
| Ligand | 10 mol% di-$^t$BuBipy | 37% |
| Amount of ligand | 5 mol% Bipy | 70% |
| | 15 mol% Bipy | 56% |
| Sup. electrolyte | 0.2M LiBr | Traces |
| Solvent | DMA | 84% |
| | MeCN | 37% |
| Frequency (in DMA) | 0.5 Hz | 61% |
| | 5 Hz | 33% |
| Temperature (DMA) | 60°C | 87% |
| DC (DMA, 60°C) | 2.8V | 13% (22% $Ar_2$) |
| No current (DMA, 60°C) | | 0% |

| Deviations from initial conditions | | NMR yield |
|---|---|---|
| None | | 49% |
| Base | 1 eq. DABCO | 10% |
| Ligand | 10 mol% di-$^t$BuBipy | 26% |
| Amount of ligand | 5 mol% Bipy | 45% |
| | 20 mol% Bipy | 17% |
| Solvent | DMA | 32% |
| | MeCN | 27% |
| Amount of base | 2 eq. Quinuclidine | 64% (2% Ar$_2$) |
| Frequency (2 eq. Quinuclidine) | 0.5 Hz | 42% (13% Ar$_2$) |
| | 5 Hz | 77% (1% Ar$_2$) |
| | 10 Hz | 70% (No Ar$_2$) |
| | 25 Hz | 56% (No Ar$_2$) |
| DC (2 eq. Quiuclidine) | 2.8V | 26% (69% Ar$_2$) |
| No current (2 eq. Quinuclidine) | | 0% |

*Amines scope*

*Aryl bromides scope*

A Relevant cyanation reports

*a) 2019, Rousseaux et al.*

*b) 2019, Mashima et al.*

*c) 2017, Morandi et al.*

B Malononitrile in cyanation of aryl halides

*a) This work*

*b) 2012, Zhou et al.*

*c) 2014, Cai et al.*

| Separator material | NMR yields | | | |
|---|---|---|---|---|
| | Aromatic amine | Starting material | Diaryl side product | Phenol side product |
| Paper tissue | 92% | 4% | 2% | 2% |
| Glass slide pieces | 91% | 5% | 2% | 2% |
FIGURE 19C
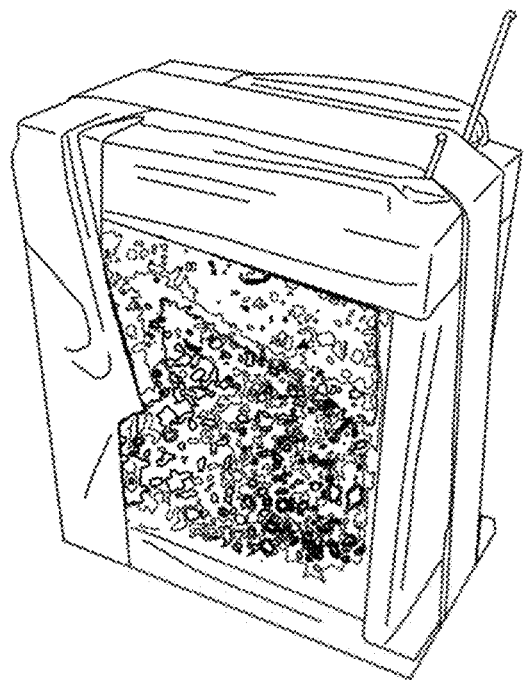
FIGURE 20A
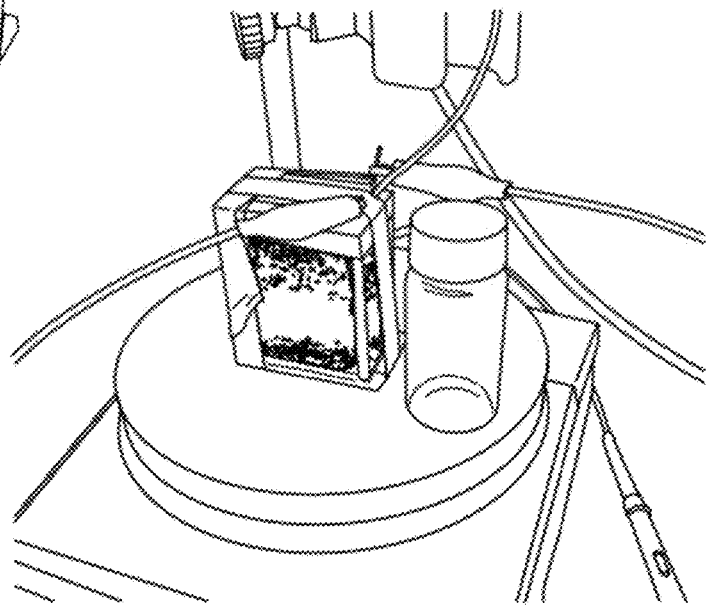
FIGURE 20B

ALTERNATING CURRENT (AC) TRANSITION-METAL CATALYSIS

CROSS-REFERENCE TO RELATED APPLICATIONS

This application is a National Phase Application of PCT International Application No. PCT/IL2021/051129, International Filing Date Sep. 14, 2021, claiming priority from IL Patent Application No. 277384, Filed Sep. 15, 2020, which are hereby incorporated by reference.

FIELD OF THE INVENTION

This invention provides a catalytic process wherein alternating current is used for catalytic coupling (such as C—C, C—N, C—O, C—S, C—P, C—Si and/or C—B couplings) using a transition-metal catalysis.

BACKGROUND OF THE INVENTION

The coupling of transition-metal to photoredox catalytic cycles through single-electron transfer steps has become a powerful tool in the development of catalytic processes.

An example of a transition metal catalyst is a Ni-based catalyst which attracted much attention as an effective tool for forming the C(aryl)-Heteroatom bond, which is frequently found in drug-like molecules, dyes, and conjugated polymers. Ni-catalysis is susceptible to facilitation by energy inputs from light or electricity because of the availability of nickel redox states ranging from 0 to +4 (FIG. 1A-1B).

By merging photoredox and transition-metal catalysis, MacMillan and others[1-5] enabled previously elusive Ni-catalyzed C—C, C—N, and C—O coupling reactions. In most situations, the coupling between photoredox and nickel catalysis involves single-electron oxidation and reduction of nickel catalytic species by a photoredox catalyst (FIG. 1A). Thus, oxidation to Ni(III) species enables reductive elimination, whereas reduction to Ni(0) species accelerates oxidative addition. Baran's group[6], exemplified C—N coupling, showing that the photocatalytic approach might be successfully replaced with assistance by direct current (DC) electrolysis.

Currently, AC has a significantly more modest application in organic synthesis compared with DC (FIG. 1B). Generally, it is used for preventing electrode fouling. Notable works showed that AC can be successfully applied in the electrosynthesis of phenol, trifluoromethylated arenes, or in accelerating S—S bond metathesis through reversible redox steps[7-9]. However, no transition-metal catalysis has been shown in conjunction with AC.

REFERENCES

1. E. B. Corcoran et al., Aryl amination using ligand-free Ni(II) salts and photoredox catalysis. *Science* 353, 279-283 (2016).
2. Z. Zuo et al., Merging photoredox with nickel catalysis: coupling of alpha-carboxyl sp(3)-carbons with aryl halides. *Science* 345, 437-440 (2014).
3. C. P. Johnston, R. T. Smith, S. Allmendinger, D. W. MacMillan, Metallaphotoredox-catalysed sp(3)-sp(3) cross-coupling of carboxylic acids with alkyl halides. *Nature* 536, 322-325 (2016).
4. J. A. Terrett, J. D. Cuthbertson, V. W. Shurtleff, D. W. MacMillan, Switching on elusive organometallic mechanisms with photoredox catalysis. *Nature* 524, 330-334 (2015).
5. J. Twilton et al., The merger of transition metal and photocatalysis. *Nat. Rev. Chem.* 1, 0052 (2017).
6. C. Li et al., Electrochemically enabled, nickel-catalyzed amination. *Angew. Chem. Int. Ed. Engl.* 56, 13088-13093 (2017).
7. B. Lee, H. Naito, M. Nagao, T. Hibino, Alternating-current electrolysis for the production of phenol from benzene. *Angew. Chem. Int. Ed. Engl.* 51, 6961-6965 (2012).
8. S. Rodrigo et al., Alternating current electrolysis for organic electrosynthesis: trifluoromethylation of (hetero) arenes. *Org. Lett.* 10.1021/acs.orglett.0c01906 (2020). [published in *Org. Lett.* online; not yet published in print]
9. L. E. Sattler, C. J. Otten, G. Hilt, Alternating Current Electrolysis for the Electrocatalytic Synthesis of Mixed Disulfide via Sulfur-Sulfur Bond Metathesis towards Dynamic Disulfide Libraries. *Chem. Eur. J.* 26, 3129-3136 (2020).

SUMMARY OF THE INVENTION

Accordingly, this invention provides, in some embodiments, AC-assisted transition-metal catalytic reactions, including amination, etherification, and esterification of aromatic bromides.

In one embodiment, this invention demonstrates that transition-metal catalysis can be coupled to alternating current (AC) through electron transfer steps that occur periodically at the same electrode. For example, and in one embodiment, nickel-catalyzed AC-assisted amination, etherification, esterification and cyanation of aromatic bromides was performed.

In some embodiments, the AC assistance is well-suited for a large number of catalytic cycles involving reductive elimination or oxidative addition as a limiting step.

In one embodiment, this invention provides a catalytic coupling process, the process comprises reacting at least one functional group A with at least one functional group B in the presence of a transition metal as a catalyst under AC voltage; wherein the reaction between the functional group A and the functional group B is intermolecular or intramolecular resulting in a C—C, C—N, C—O, C—S, C—P, C—Si, C—B or combination thereof coupling product.

In one embodiment, the at least one functional group A is a functional group of a first compound and the at least one functional group B is a functional group of a second compound, and the coupling reaction is intermolecular.

In one embodiment, the first compound comprises two or more functional groups A and the second compound comprises two or more functional groups B, and the coupling reaction will form a polymerized coupling product.

In one embodiment, the functional group A and the functional group B is of a third compound, and the coupling product is intramolecular.

In one embodiment, the process is conducted in an electrochemical cell, wherein the cell comprises:
- a first electrode, a second electrode and an electrolyte;
- a transition-metal catalyst;
- a first compound, or a second compound, or a third compound or a combination thereof;

wherein by applying the AC voltage between said first electrode and said second electrode sequential oxidation and reduction of said transition metal occur and thereby inducing a coupling reaction between at least one functional group A and at least one functional group B.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 1A-1D demonstrates some methods for activating Ni-based catalytic cycles by sequential oxidation and reduction: (FIG. 1A) Photoredox-assisted; (FIG. 1B) DC-assisted; (FIG. 1C) AC-assisted couplings. (FIG. 1D) Working hypothesis of the mechanism underlying the coupling of alternating current (AC) to the nickel catalytic cycle for cross-coupling reactions.

FIG. 2B-FIG. 2D show optimization of conditions for AC-assisted amination, esterification, and etherification reactions, respectively. NMR yields were determined by 1H and 19F NMR spectroscopy.

Figure 3A:
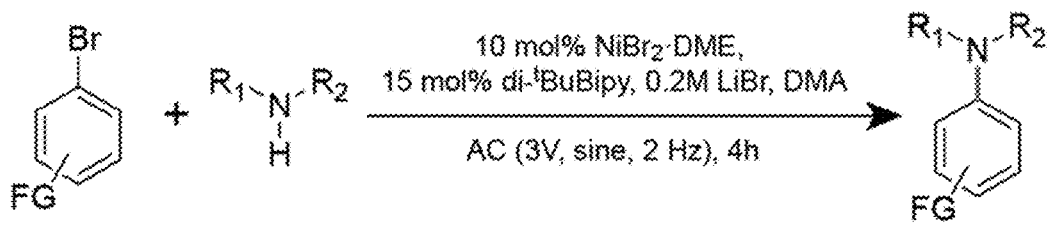
FIGS. 3A-3C illustrates the scope of AC-assisted nickel-catalyzed amination (FIG. 3A), esterification (FIG. 3B), and etherification (FIG. 3C). Isolated yields are shown. NMR yields are shown in parentheses. For details of the experimental protocols, see Example 1. Boc refers to tertbutoxycarbonyl. $^a$—refers to the reaction conditions for the synthesis of compound 11—a mixture of the corresponding amine hydrochloride (3 eq.) and $K_2CO_3$ (5 eq.) was used instead of amine. $^b$—referring to the reaction conditions for the synthesis of compound 21-sodium acetate (5 eq.) was used instead of a mixture of carboxylic acid and $K_2CO_3$.
Figure 3A:
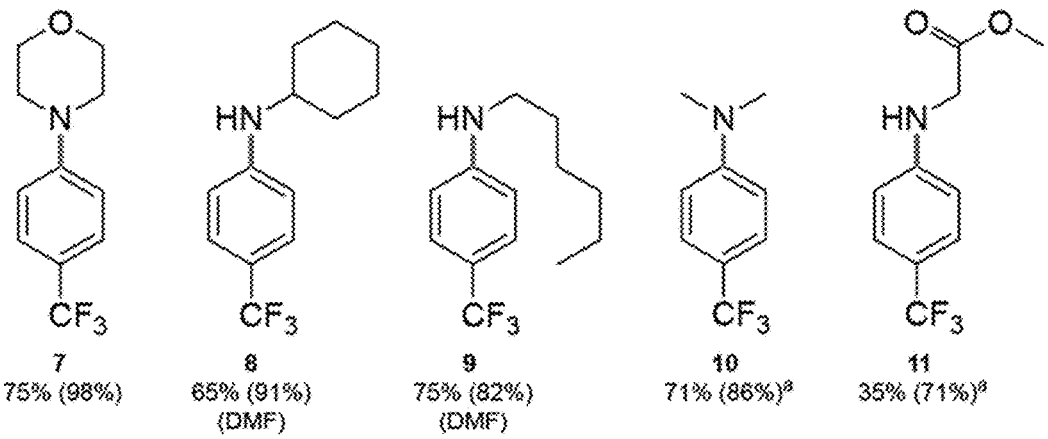
Figure 3A:
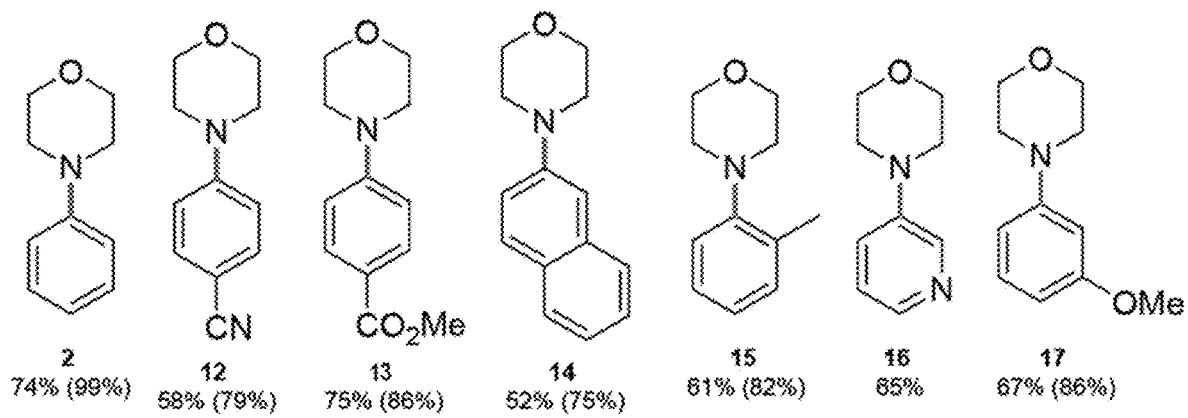
Figure 3B:
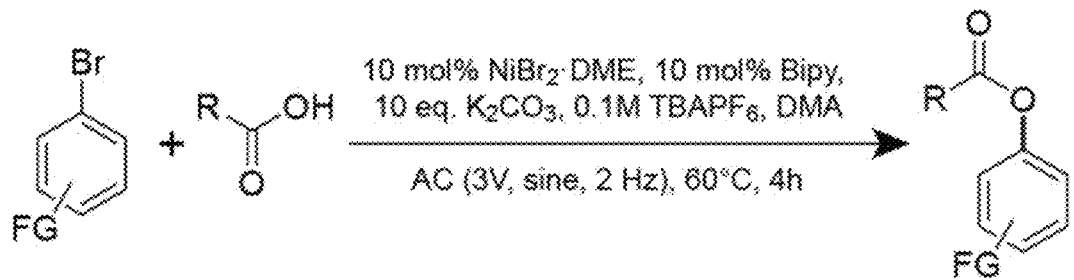
Figure 3B:
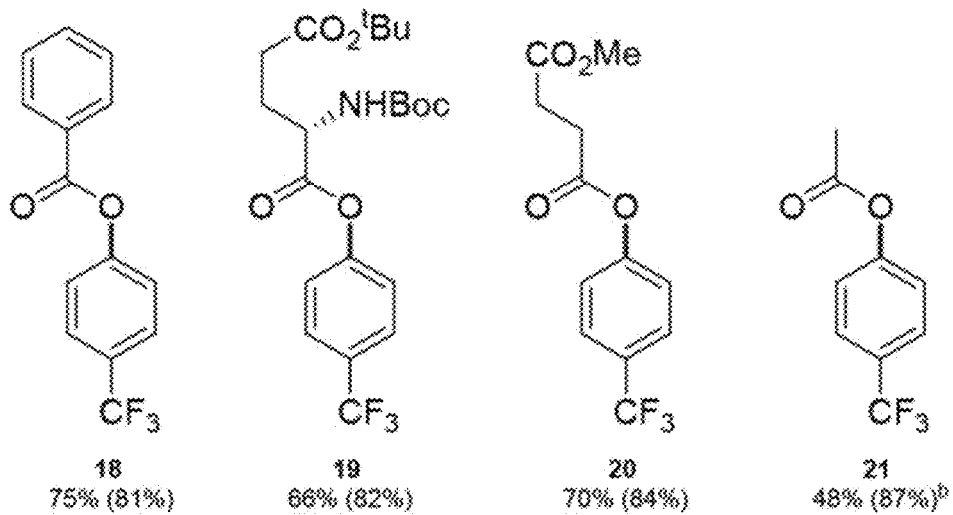
Figure 3B:
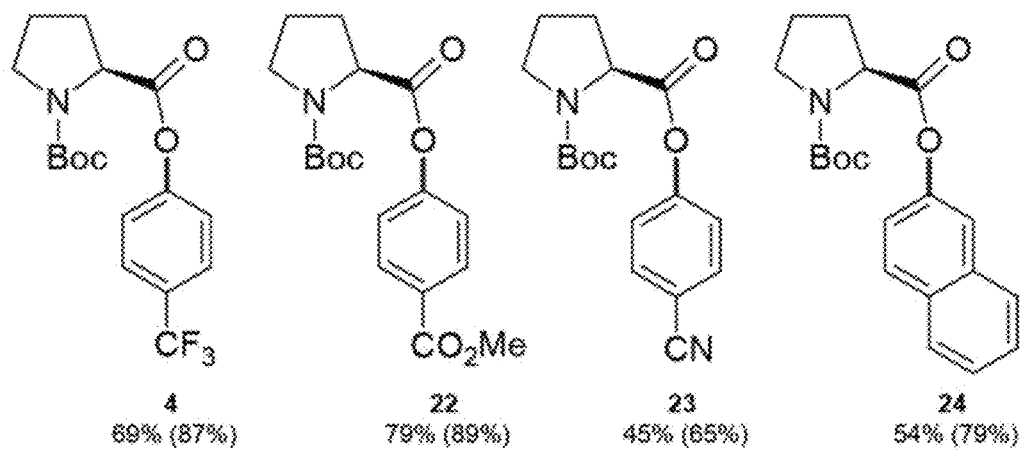
Figure 3C:
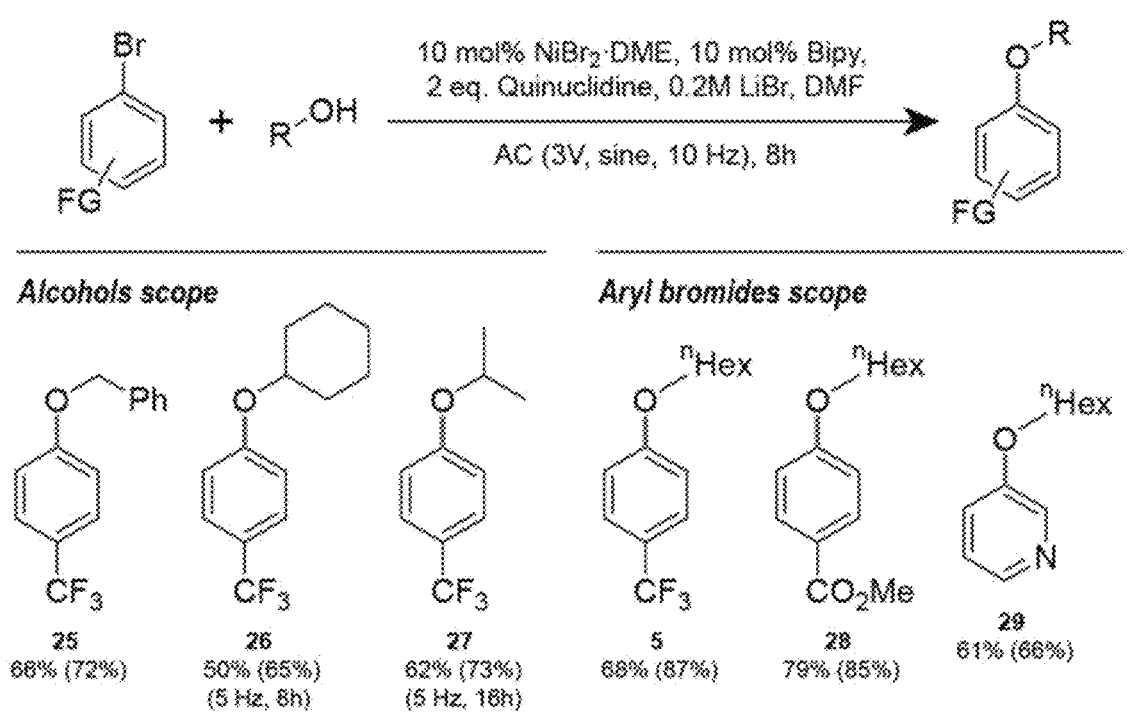

Esterification of 3 resulted in 50-75% yields for aliphatic, aromatic, and Boc (tert-Butyloxycarbonyl) protected amino acids (FIG. 3B). Other electron-deficient aryl bromides (i.e., 4-bromobenzonitrile and methyl 4-bromobenzoate) and 2-bromonaphtalene also reacted smoothly with Boc-L-proline with 50-80% yields. The highest yields (70-80%) in etherification were achieved in reactions with electron-deficient aryl bromides and primary alcohols (FIG. 3C). The reactions with secondary alcohols—cyclohexanol and isopropanol—gave 50-60% yields but required a 6-fold instead of a 3-fold excess of alcohol and a prolonged reaction time.

FIGS. 4A-4E shows mechanistic studies of the cross-coupling reactions. (FIG. 4A) GC electrode potential vs NSE in a typical amination experiment (3 (50 mM), morpholine (150 mM), $NiBr_2$·DME (5 mM), di-$^t$BuBipy (7.5 mM), LiBr (0.2M), and DMA). (FIG. 4B) CV curve of a $NiBr_2$·DME (2 mM) and a Bipy (2 mM) solution before (blue) and after (gray) the addition of 3 (2 mM) (0.1M $TBAPF_6$, DMA). (FIG. 4C) Amination in the divided cell without stirring. The concentrations of the reagents are identical to A. (FIG. 4D) Control experiment of amination with DC and Zn sacrificial anode. The concentrations of the reagents are identical to A. (FIG. 4E) Kinetics of the amination reaction between 3 (50 mM) and morpholine (150 mM) ($NiBr_2$·DME (5 mM), Bipy (7.5 mM), LiBr (0.2M), DMA) with ON/OFF cycles of AC. Conversion of 3 to 7 was determined by HPLC.

Figure 5A:
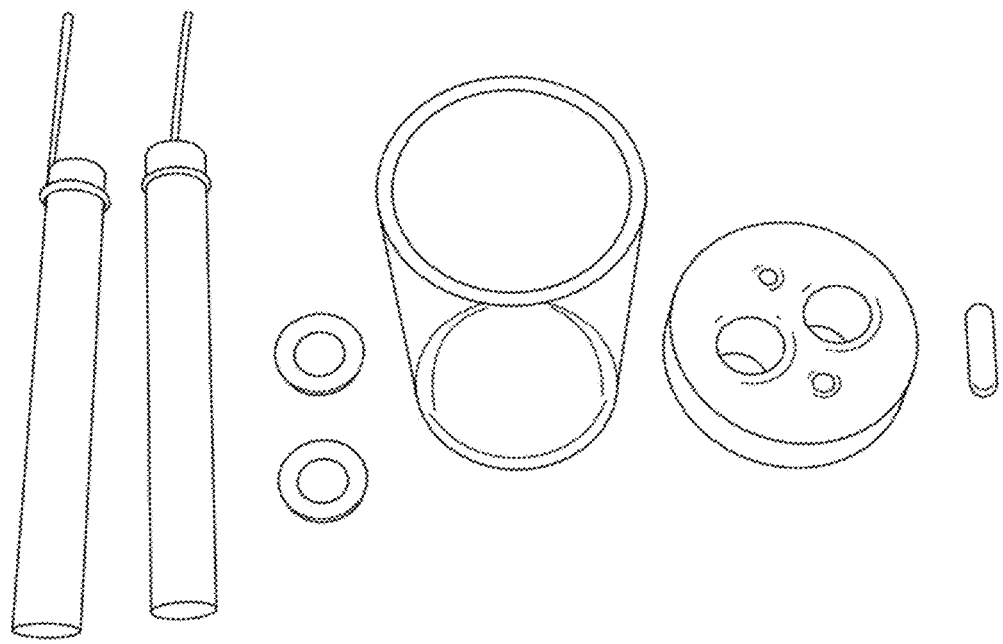
Figure 5B:
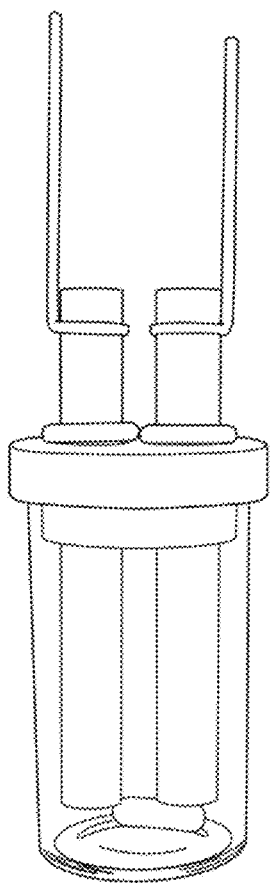

FIGS. 5A-5B shows an electrochemical cell in the disassembled (FIG. 5A) and assembled (FIG. 5B) states.

Figure 6:
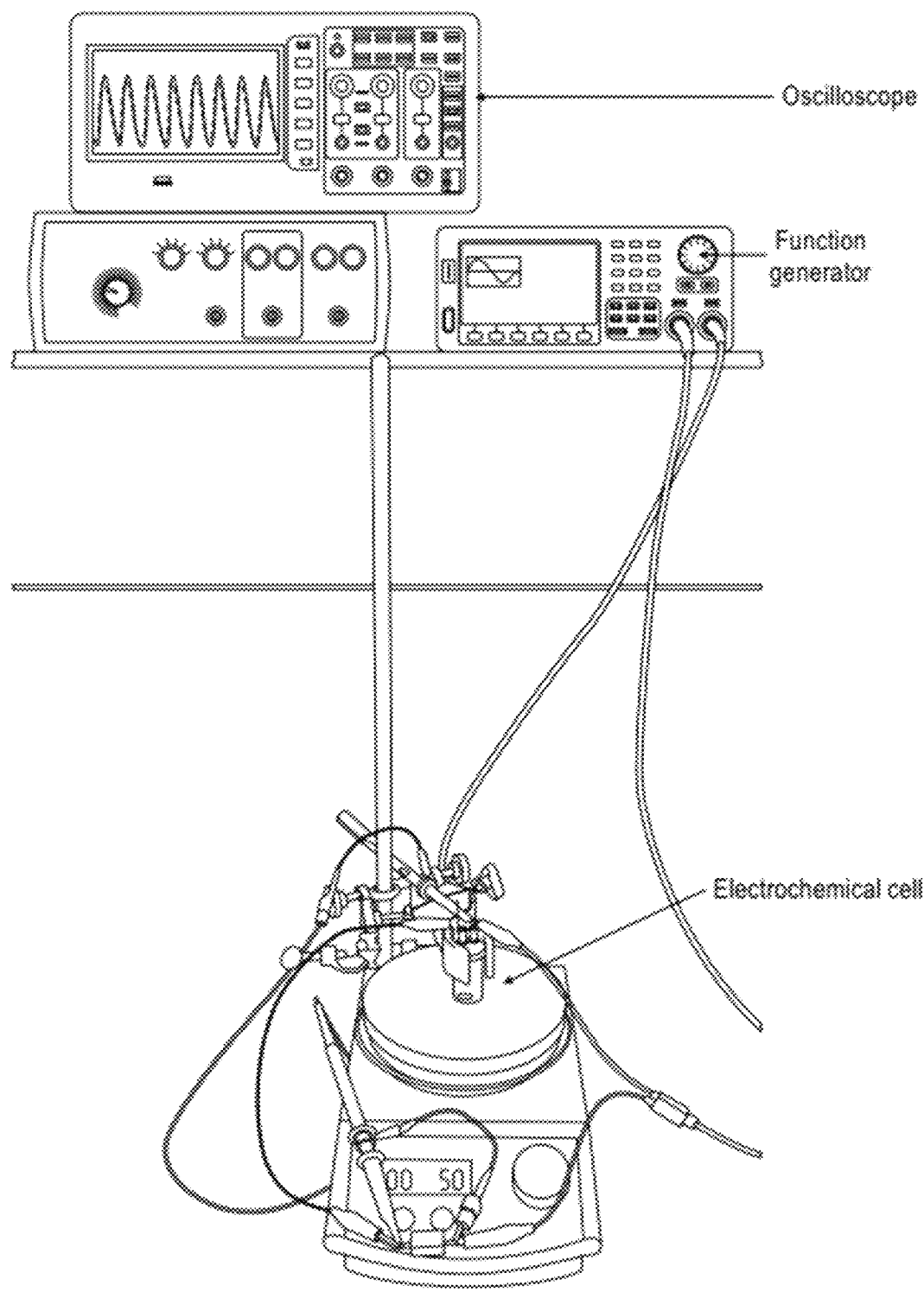

FIG. 6 is a typical experimental set-up for AC-assisted catalysis.

Figure 7:
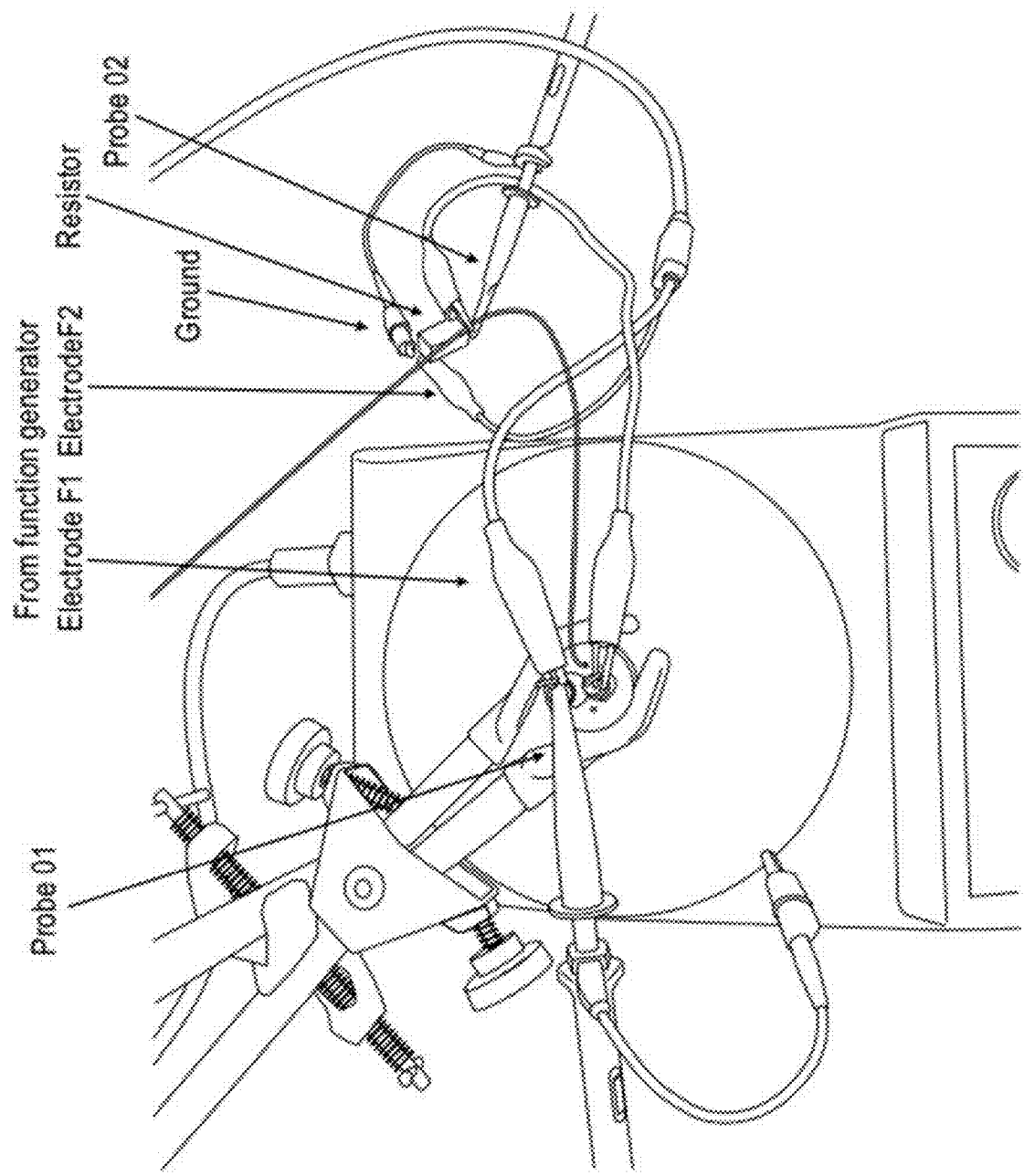

FIG. 7 shows the connection of an electrochemical cell to a function generator and an oscilloscope.

Figure 8:
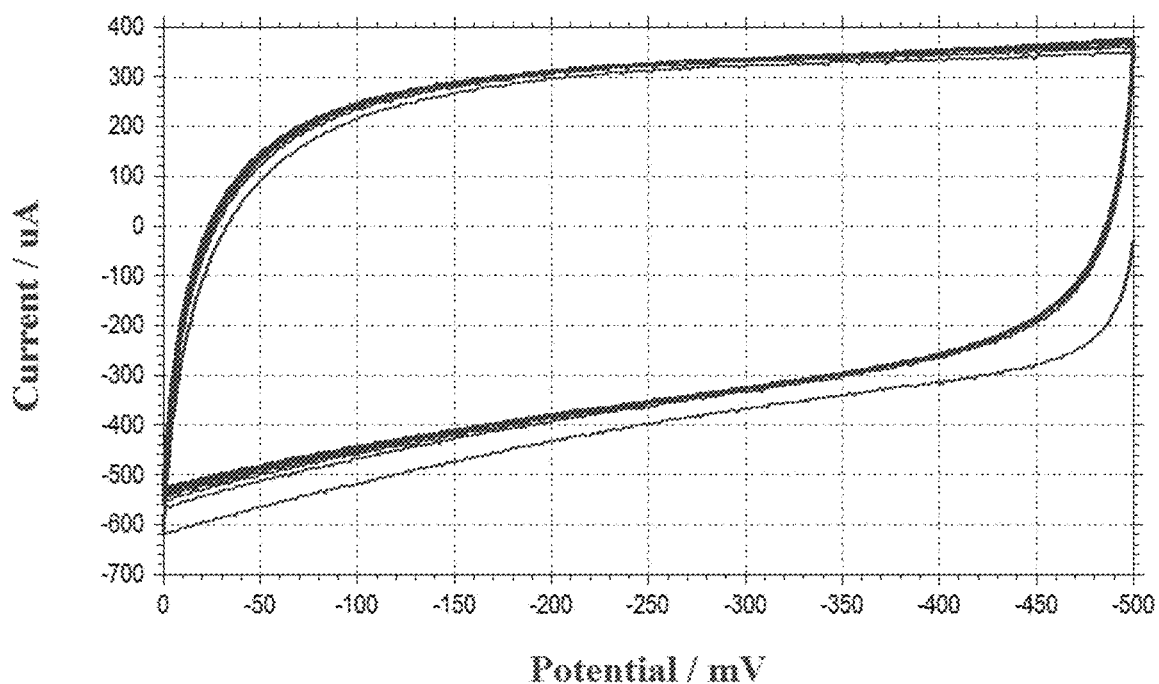

FIG. 8 is a CV curve recorded for 0.2M LiBr in DMF (GC rods were used as working and counter electrodes: scan rate—6 V/s, 10 cycles).

Figure 9:
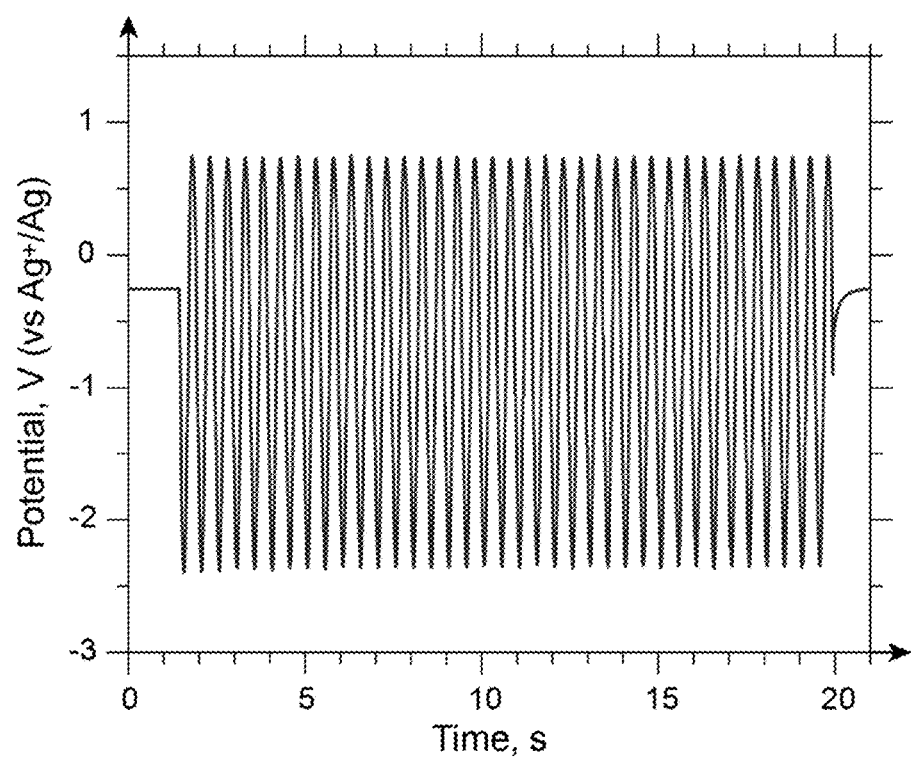

FIG. 9 shows GC electrode potential vs the $Ag^+$/Ag reference electrode in the etherification experiment described above.

Figure 10:
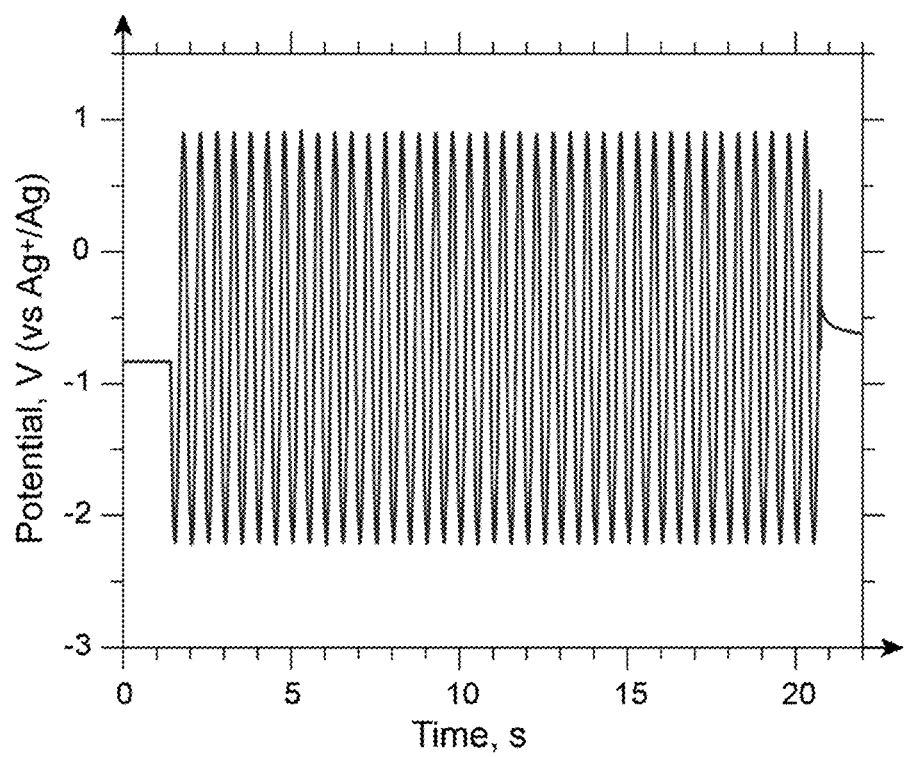

FIG. 10 shows GC electrode potential vs the $Ag^+$/Ag reference electrode in the esterification experiment described above.

Figure 11:
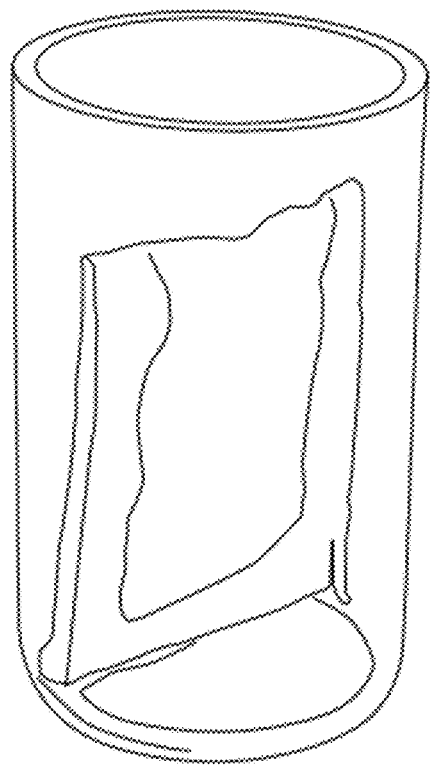

FIG. 11 shows a self-made divided electrochemical cell.

Figure 12:
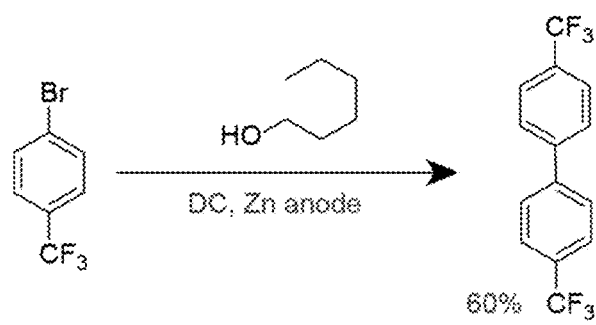

FIG. 12 is a control experiment with DC and Zn sacrificial anode. 4-bromobenzotrifluoride (50 mM), n-Hexanol (150 mM), Quinuclidine (50 mM), $NiBr_2$·DME (5 mM), Bipy (5 mM), LiBr (0.2M), and DMF).

Figure 13:
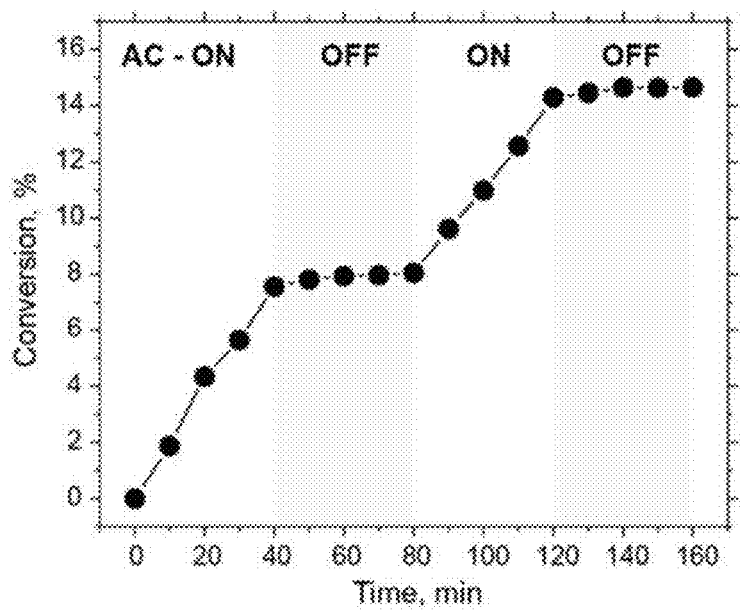

FIG. 13 shows kinetics of the etherification reaction between 4-bromobenzotrifluoride (50 mM) and n-hexanol (150 mM) (Quinuclidine (100 mM), $NiBr_2$·DME (5 mM), Bipy (5 mM), LiBr (0.2M) in DMF) with ON/OFF cycles of AC. Conversion of 4-bromobenzotrifluoride) to 1-(hexyloxy)-4-(trifluoromethyl)benzene was determined by HPLC.

Figure 14:
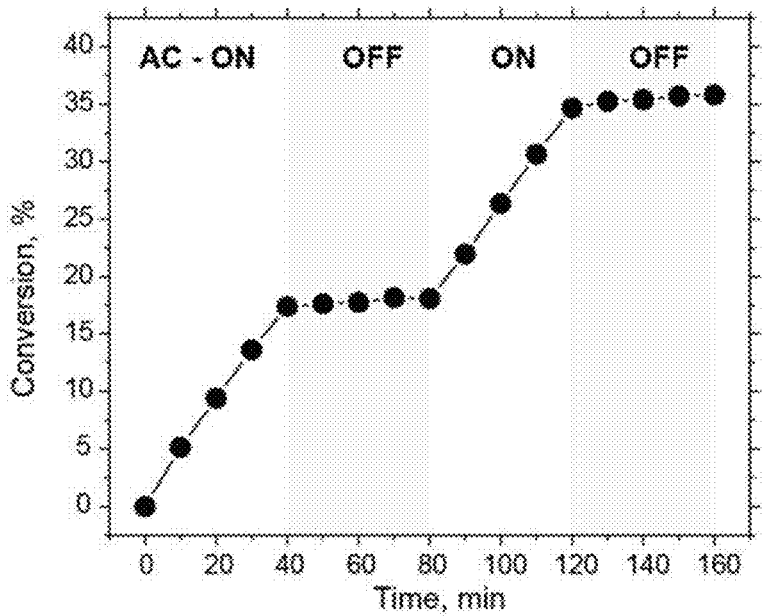

FIG. 14 presents kinetics of the esterification reaction between 4-bromobenzotrifluoride (3) (50 mM) and benzoic acid (75 mM) (Quinuclidine (5 mM $NiBr_2$·DME, 5 mM Bipy, 10 equiv. $K_2CO_3$ in 0.1M $TBAPF_6$ DMA solution) with ON/OFF cycles of AC. Conversion of 4-bromobenzotrifluoride (3) to 4-(trifluoromethyl)phenyl benzoate (18) was determined by HPLC.

Figure 15A:
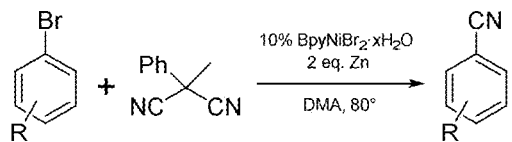
Figure 15A:
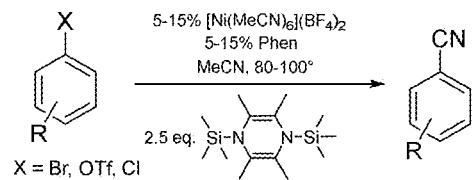
Figure 15A:
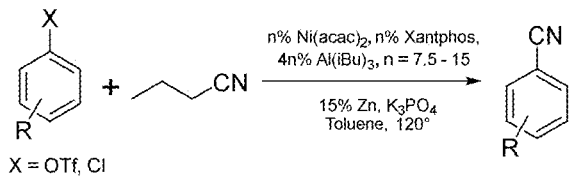
Figure 15B:
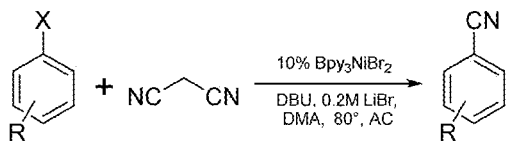
Figure 15B:
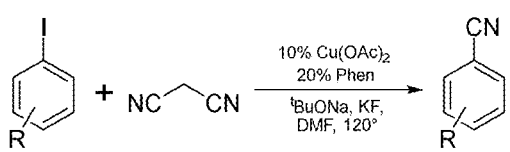
Figure 15B:
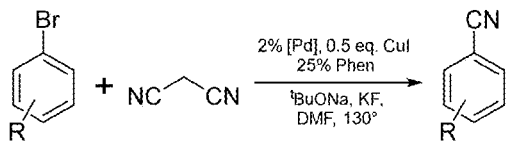

FIGS. 15A-15B cyanation of aryl halides.

Figure 16:
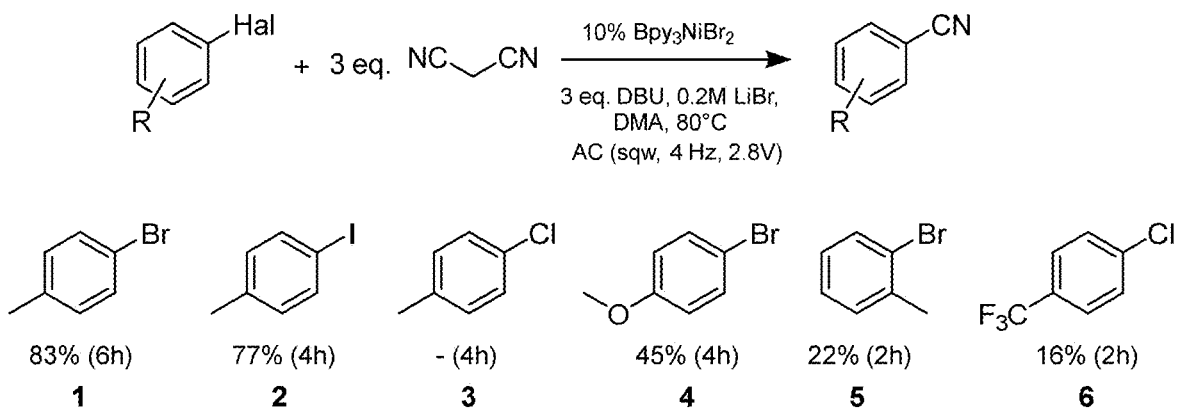

FIG. 16 studies of scope of AC-assisted Ni-catalyzed cyanation.

Figure 17:
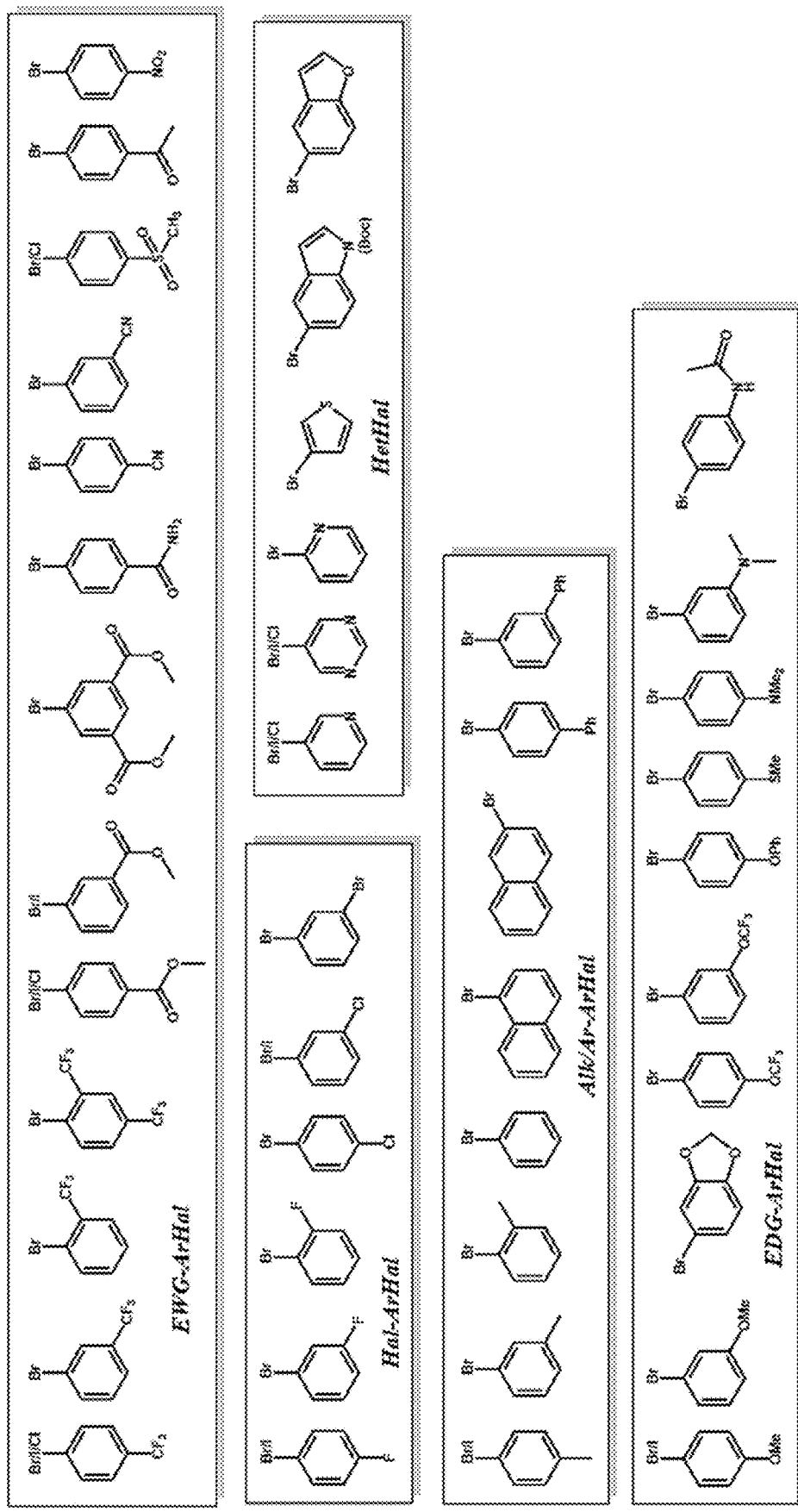

FIG. 17 Preliminary list of aryl halides for the investigation of the scope of AC-assisted Ni-catalyzed cyanation.

Figure 18:
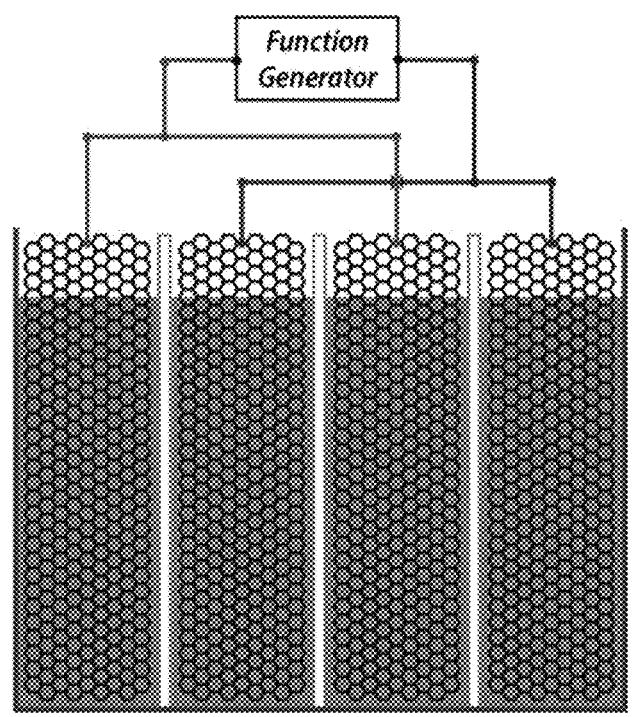

FIG. 18 an embodiment of a proposed design for RVC-filled batch reactor.

Figure 19A:
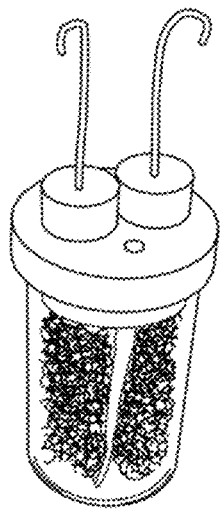
Figure 19B:
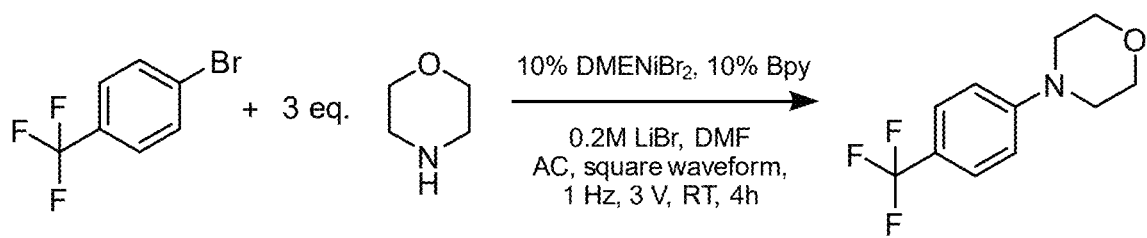

FIGS. 19A-19C small-scale set-up FIG. 19A; Reaction conditions FIG. 19B; results of a preliminary experiment FIG. 19C.

FIGS. 20A-20B 1 mmol scale set-up; Before and after connection to generator, FIG. 20A and FIG. 20B respectively.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

This invention provides a catalytic process merging alternating current (AC) with transition-metal-catalyzed cross-coupling reactions. AC provides a catalytic cycle assisted by a pair of redox processes. As a result of the AC periodical polarity switch, both redox steps can successfully occur at the same electrode with a tunable delay between them.

Accordingly, this invention provides in some embodiments, AC-assisted transition-metal catalyzed reactions, wherein the AC displays profound advantages over DC in the electrochemical cell.

In one embodiment, this invention provides a catalytic coupling process, the process comprises reacting at least one functional group A with at least one functional group B in the presence of a transition metal as a catalyst under AC voltage; wherein the reaction between the functional group A and the functional group B is intermolecular or intramolecular resulting in a C—C, C—N, C—O, C—S, C—P, C—Si, C—B or combination thereof coupling product.

In one embodiment, the at least one functional group A is a functional group of a first compound and the at least one functional group B is a functional group of a second compound, and the coupling reaction is intermolecular.

In one embodiment, the first compound comprises two or more functional groups A and the second compound comprises two or more functional groups B, and the coupling reaction will form a polymerized coupling product.

In one embodiment, the first compound comprises at least one functional group A and at least one functional group B and the second compound comprises at least one functional group A and at least one functional group B, and the coupling reaction will form a polymerized coupling product. According to this aspect and in one embodiment, the first and second compounds can be the same or different.

In one embodiment, the functional group A and the functional group B is of a third compound, and the coupling product is intramolecular.

In one embodiment, the C—N coupling comprises an amination reaction. In one embodiment, the C—O coupling comprises an esterification reaction. In one embodiment, the C—O coupling comprises etherification reaction. In one embodiment, the C—O coupling comprises an esterification and etherification reactions. In one embodiment, C—C coupling comprises a cyanation reaction. In one embodiment, the etherification process requires a base. In one embodiment, the esterification process requires a base. In another embodiment, the base for the etherification or esterification process comprises potassium carbonate, potassium tertbutoxide, 1,4-diazabicyclo[2.2.2]octane (DABCO), 1,8-Diazabicyclo[5.4.0]undec-7-ene (DBU), trimethylamine, diisopropylethylamine, triethylamine, cesium carbonate, quinuclidine or combination thereof.

In one embodiment, the process is a catalytic process and comprises reductive elimination and oxidative addition of the transition metal intermediates within the catalytic cycle.

In one embodiment, the first compound comprising at least one functional group A is an aromatic halide and the second compound comprising at least one functional group B is a nucleophile compound.

In one embodiment, the nucleophile compound comprises R—OH, R—$NH_2$, R—NH—$R^1$, R—COOH, $N_3^-$, $CN^-$, R—SH, R—C(O)NH—$R^1$, R—PH—$R^1$, (RO)—P(O)H—($OR^1$), R—P(O)H—($OR^1$), HSi—$(R)_3$, HB—$(OR)_2$, HB—$(R)_2$ $(OR)_2$—B—B—$(OR)_2$, wherein R is H, substituted or unsubstituted alky, aryl, heteroaryl, cycloalkyl or heterocycloalkyl; $R^1$ is H, substituted or unsubstituted alky, aryl, heteroaryl, cycloalkyl or heterocycloalkyl; or R and $R^1$ form together a cyclic 5-6 membered ring.

In one embodiment, the concentration of the transition-metal in the electrolyte is ranging between 0.1 to 20 mol % of catalyst vs. the first compound, the second compound or the third compound.

In one embodiment, the yield of the process is at least 50%, or at least 60% or at least 75%, or at least 80%.

In one embodiment, the amount of by-products formed is less than 5%. In one embodiment, the amount of side products formed is less than 5%. According to this aspect and in one embodiment, using AC in the process reduces the amount of side products formed, as described herein below.

Electrochemical Cell

In one embodiment, the process of this invention is conducted in an electrochemical cell, wherein the cell comprises:
a first electrode, a second electrode and an electrolyte;
a transition-metal catalyst;
a first compound, or a second compound, or a third compound or a combination thereof;
wherein by applying the AC voltage between said first electrode and said second electrode sequential oxidation and reduction of said transition metal occur and thereby inducing a coupling reaction between at least one functional group A and at least one functional group B.

In one embodiment, in a process of this invention,
at least one oxidation process and at least one reduction process of said transition metal catalyst occur by electron transfer to or from said first electrode;
at least one oxidation process and at least one reduction process of said transition metal catalyst occur by electron transfer to or from said second electrode; or
a combination thereof.

In one embodiment, the electrolyte within the electrochemical cell used in the process of this invention comprises an anhydrous solvent or an organic solvent or optionally water is added to the anhydrous or organic solvent. In one embodiment, the electrolyte comprises dimethylformamide (DMF) and/or dimethylacetamide (DMA), and LiBr and/or $NBu_4PF_6$.

In one embodiment, the first electrode and second electrode are each independently comprise glassy carbon rod, glassy carbon foam, glassy carbon plate or a glassy carbon porous electrode. In one embodiment, the first electrode and second electrode are each independently comprise carbon (glassy carbon, graphite, carbon nanotubes), Ag, Pt, Au, W, Pb, Ti, Ni, Co or stainless steel. In another embodiment, the first electrode and second electrode are each independently a glassy carbon rod. In another embodiment, the first electrode and second electrode are each independently a foam. In another embodiment, the first electrode and second electrode are each independently a plate. In another embodiment, the first electrode and second electrode are each independently a porous electrode. In another embodiment, the first electrode and second electrode are each independently a graphite. In another embodiment, the first electrode and second electrode are each independently a carbon nanotube. In another embodiment, the first electrode and second electrode are each independently a Ag, Pt, Au, W, Pb, Ti, Ni, Co or stainless steel electrodes. Combination of materials from embodiments described herein above is included in embodiments of this invention for which the first and the second electrodes are of the same material. Combination of materials from embodiments described herein above is included in embodiments of this invention for which the first and the second electrodes are of different material. Combination of structures from embodiments described herein above is included in embodiments of this invention for which the first and the second electrodes are of the same structure. Combination of structures from embodiments described herein above is included in embodiments of this invention for which the first and the second electrodes are of different structure. In one embodiment, the catalyzed reaction (e.g. the coupling reaction) is conducted on both electrodes. This is another advantage of the process described herein. However, in other embodiments, for certain applications, the catalyzed reaction is conducted on one electrode. In one embodiment, such process is conducted in a divided cell designed for this purpose.

In one embodiment, the first electrode, the second electrode or a combination thereof is/are porous. In one embodiment, porosity measure of the electrode(s) is by pores per inch (ppi). In one embodiment, for electrodes of this invention ppi ranges between 10-20 ppi, or between 10-100 ppi. In one embodiment, pore size ranges between 1-2 mm or between 0.1-5 mm or between 0.25 mm-2.5 mm. Porosity can be described by the surface area of the electrode(s), by surface area per volume or by surface area per gram. Electrodes of this invention may have any value of porosity that is compatible with the AC technique and with the compounds/solutions used in embodiments of this invention. In embodiments where more than two electrodes are used as described herein below, features of the first and second electrodes may apply also to any additional electrodes.

In one embodiment, the process of this invention is conducted in an electrochemical cell, wherein the cell comprises:
   a first electrode, a second electrode and an electrolyte;
   a transition-metal catalyst;
   a first compound, or a second compound, or a third compound or a combination thereof;
wherein by applying the AC voltage between said first electrode and said second electrode sequential oxidation and reduction of said transition metal occur and thereby inducing a coupling reaction between at least one functional group A and at least one functional group B; and wherein
   the first electrode, the second electrode or a combination thereof is/are porous; and wherein
   the first electrode, the second electrode or a combination thereof occupy at least 50% of the volume of the cell.
   Functional groups A, B reside on one or more of the compounds in one embodiment.

In one embodiment, the volume of the cell is the volume of the container that make up the cell. In one embodiment, the volume of the cell is the volume occupied by the electrolyte in the cell. In one embodiment, the volume of the cell is the volume available for the catalyzed reaction. In one embodiment, the volume of the cell is the size of the cell.

In one embodiment, if the cell is divided, this invention provides a process as follows:

In one embodiment, the process of this invention is conducted in an electrochemical cell, wherein the cell comprises:
   a first electrode, a second electrode and an electrolyte;
   a transition-metal catalyst;
   a first compound, or a second compound, or a third compound or a combination thereof;
wherein by applying the AC voltage between said first electrode and said second electrode, sequential oxidation and reduction of said transition metal occur and thereby inducing a coupling reaction between at least one functional group A and at least one functional group B; and wherein
   the first electrode, the second electrode or a combination thereof is/are porous; and wherein
   the first electrode, the second electrode or a combination thereof occupy at least 50% of the volume of the half cell.

According to this aspect and in one embodiment, in a divided cell, the combination of the two electrodes occupies at least 50% of the volume of the whole cell.

In one embodiment, the first electrode, the second electrode or a combination thereof occupy at least 50% or at least 60% or at least 70% or at least 80% or at least 90% or at least 95% or at least 99% of the volume of the cell or of the half cell.

It is to be noted that the electrode volume calculated for these embodiments is the volume occupied within the external surfaces of the electrodes. The electrode volume calculation for these embodiments, considers and includes the pore volume as part of the electrode volume. In other words, the pore volume is included in the electrode volume for the embodiments referred to herein above. For example, the volume of a porous electrode of size 4 cm×4 cm×1 cm, is the volume of the whole electrode, (16 cm$^3$). This volume calculation does not reflect the volume of the electrode material only, but rather, the volume that the electrode occupies within the cell. Accordingly and in one embodiment, the volume of the electrode is the volume defined by the external surfaces of the electrode. Accordingly and in one embodiment, the volume of the electrode is the volume enclosed within the external surfaces of the electrode. In one embodiment, the volume of the electrode is the size of the electrode. In one embodiment, the volume of the electrode is the size of the electrode as noted by the manufacturer.

In one embodiment, two pairs of electrodes are included in designs of this invention. As shown for example in FIG. 18, the two pairs are configured such that neighboring electrodes are connected to opposite current polarities. Such configuration enhances the reaction in one embodiment. Such configuration makes the reaction more efficient in one embodiment. Such configuration may contribute to higher yield, higher reaction rate, lower amount of side products and other advantages in embodiments of this invention. The configuration shown in FIG. 18 can be extended to a higher number of electrodes that are arranged such that neighboring electrodes are connected to opposite polarities for AC application. Numerous cell designs are possible for such configurations. For example, a cell comprising a row of at least two pairs of electrodes. An array of electrodes, comprising rows and columns, wherein each electrode is in close proximity to four opposite polarity electrodes on its four sides. Such arrays can be assembled in any convenient shape such as a square (cube), rectangle, cylinder etc. The cell container may assume the geometry of the electrode array. The number of electrodes in the array is not limited and can be at least two, at least six, at least 10, or at least 20 electrodes per cell. According to this aspect and in one embodiment, electrodes in a row or a column are placed alternately such that each electrode is placed between two electrodes that are connected to the opposite current/voltage polarity. In one embodiment, the alternating electrodes are arranged as concentric circles, such that each electrode is shaped as a cylinder or as a circle, and each electrode is placed adjacent to an electrode(s) connected to an opposite V/I terminal. For example, an inner rod-shaped electrode of one polarity is surrounded by a circular/cylindrical electrode of another polarity, which in turn may be surrounded by a third circular/cylindrical electrode connected to the polarity of the inner rod. Such arrangement can be extended to include any number of electrodes. In one embodiment the electrodes cover at least 90% of the volume of the cell/half cell (or of the volume of the electrolyte). In one embodiment the electrodes occupy the total volume of the cell/half cell (or of the volume of the electrolyte).

In one embodiment, the frequency of the applied voltage is ranging between 0.5 Hz and 100 Hz and the amplitude of the applied AC voltage is at least 1V. In another embodiment, the frequency of the applied voltage is ranging between 0.5 Hz and 50 Hz and the amplitude of the applied AC voltage is at least 1V. In another embodiment, the frequency of the applied voltage is ranging between 0.5 Hz and 70 Hz and the amplitude of the applied AC voltage is at least 1V. In another embodiment, the applied AC voltage is between 1V to 10V. In another embodiment, the applied AC voltage is between 2V to 5V. In another embodiment, the applied AC voltage is between 0.5V to 5V. In another embodiment, the applied AC voltage is at least 0.5 V or at least 1V.

In one embodiment, the frequency of the applied voltage is ranging between 0.5 Hz and 100 Hz, or is ranging between 0.5 Hz and 50 Hz, or is ranging between 0.5 Hz and 70 Hz.

In one embodiment, the AC waveform is a sine wave (a sinusoidal wave). In one embodiment, the wave form is selected from a square, a rectangular, a sawtooth or ramp forms. An AC sequence of different waveforms can be applied in embodiments of this invention. As noted herein, the waveform described above refers also to the voltage applied to the system/to the electrodes in embodiments of this invention. Any other waveform can be used and is included in embodiments of this invention, as known in the art. The voltage/current waveforms described above can be applied with various frequencies and amplitudes as further detailed herein.

Figure 2A:
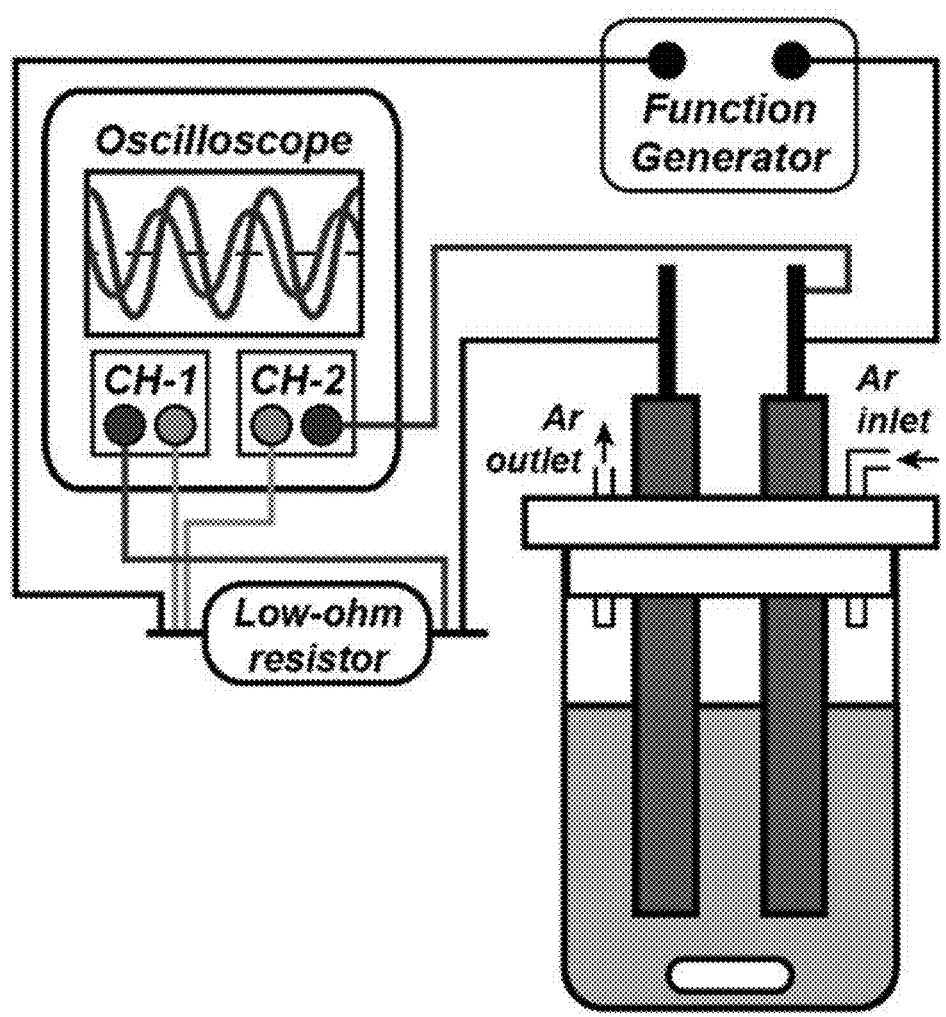
FIGS. 2A-2D FIG. 2A shows an embodiment of an experimental set-up for the AC-assisted cross-coupling reactions.

In one embodiment, the process of this invention is performed in an electrochemical cell equipped with two glassy carbon (GC) rod electrodes. A waveform generator supplies sinusoidal voltage to the electrodes. An oscilloscope is used to measure both the voltage and current (FIG. 2A, FIG. 6).

Catalyst

In one embodiment, the transition metal catalyst used in the process of this invention comprises Ni(II), Ru(II, III), Cu(I, II), Co(II, III), Fe(II, III), Cr(II, III, VI), V(II, III, IV, V), Ti(IV), Mo(III, IV, V, VI) or any combination thereof.

In one embodiment, the transition metal catalyst used in the process of this invention comprises Ni ion.

In one embodiment, the transition metal catalyst is a complex comprising a transition metal and a ligand, wherein the ligand comprises nitrogen-based ligands, phosphorus-based ligands or a combination thereof.

In one embodiment, the nitrogen-based ligands comprise a bipyridyl group, di-$^t$BuBipy, pyridine, 1,10-phenanthroline, 4,7-Diphenyl-1,10-phenanthroline or combination thereof.

In one embodiment, the phosphorus-based ligands comprise 1,2-Bis(diphenylphosphino)ethane (dppe), triphenylphosphine, tricyclohexylphosphine, 2,2'-bis(diphenylphosphino)-1,1'-binaphthyl (BINAP), 2-dicyclohexylphosphino-2',6'-dimethoxybiphenyl (SPhos) or combination thereof.

In one embodiment the catalyst complex is prepared by reacting a metal salt with a ligand.

In another embodiment NiBr$_2$·DME (DME—dimethoxyethane) reacts with 2,2'-Dipyridyl (Bipy) or 4,4'-Di-tert-butyl-2,2'-dipyridyl (di-$^t$BuBipy) to obtain a catalyst complex for use in the process of this invention. In another embodiment, a catalyst for use in the process of this invention is a Ni(II)-Bipy (Ni(Bipy)Br$_2$) complex or Ni(II) di-$^t$BuBipy complex.

In one embodiment, the catalyst is prepared in situ. In another embodiment, the catalyst is prepared separately. In one embodiment, the catalyst is provided from a commercial source.

The frequency of the applied voltage is a unique parameter for AC-assisted catalysis. Interestingly, the dependency of yield on frequency has a maximum of around 2 Hz in embodiments of this invention. The yield approached a DC yield with a decrease in frequency. The optimum "resonance" frequency may exist for some reactions because of the existence of an optimum time interval between the oxidation and reduction of intermediates in the catalytic cycles. In some embodiments, the maximum yield occurs at a frequency ranging between 1 Hz and 10 Hz.

In some embodiments the process of this invention provides new catalytic cycles by periodically oxidizing and reducing catalytic intermediates by AC which can be applied to many other catalytic systems, especially to ones that involve oxidative addition or reductive elimination as a rate-limiting step.

The use of AC provides two important advantages: (i) the absence of the need to transfer reactive intermediates between electrodes, which prevents their dilution and allows working with short-living intermediates; and (ii) the frequency and the waveform of AC are easily tunable experimental parameters that can be used to achieve the selectivity of reactions. Moreover, side electrochemical reactions might be tolerated in experiments with AC if they are fully reversible. As demonstrated by the present invention, synthetic methods based on the coupling of transition metal catalysis to AC enables new efficient transformations.

The process of this invention demonstrates well how external oscillations could couple to catalytic cycles to perform otherwise unfavorable chemical transformations. The oscillator pumps energy into the catalytic cycle by periodically modifying its intermediates and can be used further for biochemical networks where cycles with long turnover times and oscillations are common.

In one embodiment, the process is conducted with stirring of the liquid in the electrochemical cell. In another embodiment, the process is conducted without stirring of the liquid in the electrochemical cell.

In addition to the process described herein above, this invention further provides systems for conducting the process of the invention, and a product made by the process of the invention.

In one embodiment, the product made by the process of the invention, is any product of the catalyzed reaction as described herein. In one embodiment, product made by a process of this invention is a product of a reaction selected from amination, etherification, esterification or cyanation.

In one embodiment, electrochemical cells of this invention can be designed and constructed for micro-scale, small-scale, medium-scale, large scale and very large-scale syntheses. In one embodiment, electrochemical cells of this invention are compatible with industrial processes. For example and in one embodiment, the reactor (comprising or consisting of the cell) is a rectangular reactor with dimensions: height=14 cm; length=10 cm; width=4.5 cm; volume=630 cm$^3$. In one embodiment, the cell (reactor) is equipped with 4 RVC (10 ppi or 20 ppi) electrodes. Each electrode is 10×10×1 cm. In one embodiment, the electrolyte volume is 450 cm$^3$ or is ranging between 400 cm$^3$ 500 cm$^3$. It is to be noted that these values for cell structure and dimensions are merely an example. Cell geometry and dimensions, electrode geometry, size and porosity and electrolyte volume are modified in embodiments of this invention to fit synthesis scale and particular application.

In one embodiment, the term 'applying AC current' is used as known in the art. In one embodiment, 'applying AC' or 'applying AC current' or similar phrases means applying AC voltage (e.g. to at least two electrodes or to a system) and an AC current is the result of such voltage application. As used in the art, the application of AC voltage is sometimes referred to as application of AC current. Similarly, DC refers to direct current. However, in some embodiment, it is a DC voltage that is applied, and referred to as DC.

In one embodiment, this invention provides catalysis using the combination of alternating current (AC) and transition metal catalyst. The AC facilitates electron transfer for both oxidation and reduction in some embodiments, of the metal atom/ion catalyst that is required for the catalysis. Accordingly, and in one embodiment, this invention provides metal-catalyzed AC-assisted reactions.

In one embodiment, the metal is Ni. In one embodiment, the metal is selected from Cu, Co and Ru. Other metal catalysts can be used in embodiments of this invention.

In embodiments of this invention, abbreviations are as follows: ppi—pores per inch, RVC—reticulated vitreous carbon, AC—alternating current, DC—direct current, Ir=Iridium chemical symbol (in FIG. 1A it symbolizes iridium based photocatalyst), NSE—nonaqueous silver electrode.

It is to be noted that in some embodiments, sequential oxidation and reduction represent alternating oxidation and reduction reactions that may start either with oxidation or with reduction according to process protocols and parameters.

A very large number of reaction types can be catalyzed using the process of this invention.

In one embodiment, the term "a" or "one" or "an" refers to at least one. In one embodiment the phrase "two or more" may be of any denomination, which will suit a particular purpose. In one embodiment, "about" or "approximately" may comprise a deviance from the indicated term of +1%, or in some embodiments, −1%, or in some embodiments, ±2.5%, or in some embodiments, ±5%, or in some embodiments, ±7.5%, or in some embodiments, ±10%, or in some embodiments, ±15%, or in some embodiments, ±20%, or in some embodiments, ±25%.

In some embodiments, this invention provides at least one of the following advantages: it can catalyze reactions that could not be catalyzed using other methods, it provides high yield, produces small amount of by-products or side products, it requires milder conditions, does not require mixing/mass transfer, it is more efficient, provides high speed of reaction, high compound amount per volume, high speed of reaction per volume, it can be scaled-up to large reactors, it can be used in batch or in continuous mode, it is applicable to a very large number of systems/reactions.

The following non-limiting examples are presented in order to more fully illustrate certain embodiments of the invention. They should in no way, however, be construed as limiting the broad scope of the invention. One skilled in the art can readily devise many variations and modifications of the principles disclosed herein without departing from the scope of the invention.

Parameters in general procedures for processes described in the examples can be modified as shown in certain experiments. Accordingly, in one embodiment, parameters in general procedures are the parameters used unless otherwise noted. Other values for parameters, other compounds and other components not noted in the general procedures are also included in examples of this invention as described herein.

EXAMPLES

Example 1

Materials and Methods

All reactions were performed under an argon atmosphere according to the methods indicated in the general procedures.

Glassy carbon (GC) rods (100 mm×6 mm diameter) were purchased from Alfa Aesar. Platinum wire (1 mm diameter) was purchased from Holland-Moran. Ltd.(Israel). A glassy carbon disk (1 mm diameter) working electrode, a platinum wire counter-electrode, and an Ag+/Ag reference electrode were purchased from CH Instruments, Inc.

NMR spectra were measured on a Bruker AVANCE III-300 spectrometer at 300 MHz for 1H and 282.4 MHz for 19F, on a Bruker AVANCE III-400 spectrometer at 400 MHz for 1H and 100.6 MHz for 13C{1H}, and on a Bruker AVANCE III HD-500 spectrometer at 500 MHz for 1H, 125.8 MHz for 13C{1H}, and 470.6 MHz for 19F. Chemical shifts for 1H and 13C are given in ppm relative to TMS and those for 19F relative to CFCl3. 1H and 13C spectra were calibrated using a residual solvent peak as an internal reference (1H NMR: δ=7.26 ppm, 13C NMR: δ=77.16 ppm). The following abbreviations were used to explain NMR peak multiplicities: s=singlet, d=doublet, t=triplet, q=quartet, p=pentet, m=multiplet, br=broad.

A B&K Precision 4053B dual channel function/arbitrary waveform generator served as a tunable source for the alternating current. The measurements and tracking of voltage drops over the electrochemical cell and the resistor were performed using a Global Specialties DSC-5300 50 MHz Digital Storage Oscilloscope. Direct current electrolysis, cyclic voltammetry (CV), and open circuit potential measurements were performed using a CH Instruments 600E Potentiostat/Galvanostat.

The analytical chromatographic separation was performed on a Waters Acquity liquid chromatography system equipped with a 2998 PDA Detector and a Waters QDa mass detector (a mass range of 85-1250 m/z) with an electrospray ionization (ESI).

GC Rod Electrode Preparation and Cleaning Procedure

A GC rod (100 mm×6 mm diameter, Alfa Aesar) was cut in half into two equal parts (50 mm rods). A groove with a 1 mm width and 1 mm depth was made on the surface of each rod (ca. 4 mm from the end of the rod). For polishing purposes, a groove-side part of the electrode was wrapped with a piece of rubber tubing and placed in the holder of a mechanical stirrer with tunable rotation speed (an electric screwdriver can be used instead). The surface of the lower part of the electrode was then polished carefully using a convenient rotation speed and sandpaper with different grit sizes (starting from P200 and ending with P2000), achieving a mirror-shiny surface on the side and the end part of the electrode. Thereafter, an alumina powder (1-0.05 μm) with the addition of small amounts of DI water was used to finish the polishing procedure (Nylon microcloth or Chemwipes were used as substrates). The electrode was then rinsed with DI water intensively and placed in a drying oven (150-200° C.) for several hours. Next, a piece of platinum wire (ca. 4 cm, 1 mm diameter) was wrapped once along the groove on the surface of the electrode; the remaining part of the wire was straightened and directed toward the top of the electrode.

After every electrochemical experiment, the surface of the GC rod electrodes was cleaned properly in order to achieve reproducible results. For this purpose, after the end of the experiment, the electrodes, together with the teflon cap, were extracted from the reaction mixture; the teflon cap and rubber O-rings were detached. The electrodes were then rinsed with DI water and acetone; the surface of the electrodes was wiped with a piece of tissue wetted with acetone.

Next, the surface of the electrodes was polished using a mechanical stirrer and 0.05 µm alumina powder (as described in the "electrodes preparation procedure" section). Finally, the electrodes were rinsed with DI water and placed in a drying oven (150-200° C.) for several hours.

FIGS. 5A-5B shows the electrodes and various other components of the cell.

Cell Set-Up

The cell used in the electrochemical experiments consists of 4 parts: a glass cell; a teflon cap; GC rod electrodes; and two rubber O-rings (FIGS. 5A-5B and FIG. 6). The glass cell was made from a vial of a corresponding size; it has the following dimensions: height 30 mm and internal diameter 18 mm. The teflon cap has 2 large holes (for the GC rod electrodes) and 2 small holes (for the Ar inlet and outlet); rubber O-rings help to regulate and maintain the desirable position of the electrodes in the cell.

Set-Up Preparation

A picture of a typical experimental set-up is presented in FIG. 6. A detailed description of its assembly is provided herein. The electrochemical cell with a reaction mixture should first be prepared according to a procedure in the corresponding section. Then, one of the alligator clips of the function generator (electrode F1) is connected to one of the GC rod electrodes (the platinum wire part) (FIG. 7). Another GC rod electrode is connected to a resistor (usually, 10 Ohm) with the use of an additional cable with alligator clips on its ends; the remaining contact of the function generator (electrode F2) is attached to another side of the resistor. One probe from the oscilloscope (probe 02) is attached to one side of the resistor and the ground contact (ground) of the oscilloscope is attached to another side of the resistor, allowing the monitoring of the voltage drop on the resistor. The second probe of the oscilloscope (probe 01) is connected to the cell, allowing continuous monitoring of the drop of voltage over the "cell+resistor" part of the circuit.

Prior to each experiment, the waveform, frequency and amplitude of the alternating current have to be adjusted. In all of the experiments (unless otherwise noted), a sine waveform and a peak voltage of 3 V were used over the cell. The voltage over the cell can be calculated as the difference between voltage drops over the "cell+resistor" circuit part and over the resistor. The current at any time can be calculated from the value of the voltage drop over the resistor according to Ohm's law (the voltage drop over the resistor divided by its resistance).

Importantly, the resistance of the cell will change during the experiment (usually, it will increase). This leads to a change in the voltage drop over the cell. Accordingly, the amplitude of the wave might need a small readjustment to keep it constant.

Example 2

Amination Using the Process of this Invention

TABLE 1

Figure 2B:
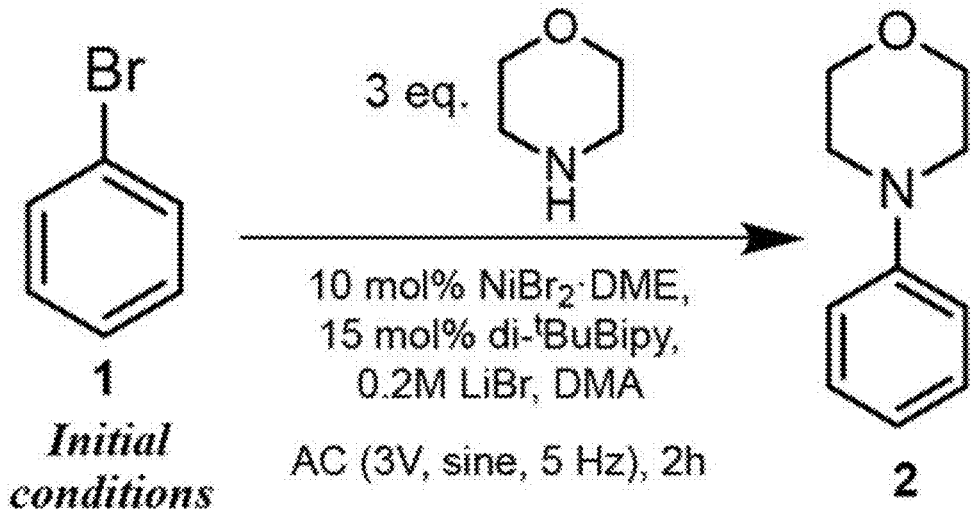

Reaction conditions for amination (See FIG. 2B):

PhBr + 3x morpholine → $\xrightarrow{\substack{10\ \text{mol}\%\ \text{NiBr}_2\cdot\text{DME},\\ 15\ \text{mol}\%\ \text{di-}^t\text{BuBipy},\\ 0.2\text{M LiBr, DMA}\\ \text{AC (3 V, sine, 5 Hz), 2 h}}}$ N-phenylmorpholine

| Deviations from the conditions above | | NMR yield |
| --- | --- | --- |
| None | | 80% |
| Ligand | 10 mol % Bipy | 79% |
| | 10 mol % BPhen | 44% |
| Amount of ligand | 10 mol % di-$^t$BuBipy | 78% |
| | 20 mol % di-$^t$BuBipy | 77% |
| Sup. electrolyte | 0.1M Bu$_4$NBr | 53% |
| | 0.2M LiCl | 16% |
| Solvent | DMF | 63% |
| Frequency | 0.1 Hz | 55% |
| | 0.5 Hz | 82% |
| | 2 Hz | 87% |
| | 10 Hz | 78% |
| | 25 Hz | 48% |
| DC | 2.8 V | 56% |
| No current | | 0% |

*BPhen stands for 4,7-Diphenyl-1,10-phenanthroline

General Procedure for the Amination Process
(A) with Amines as Substrates

To an Ar-flushed mixture containing NiBr$_2$·DME (6.2 mg, 0.02 mmol, and 0.1 equiv.), di-$^t$BuBipy (8.1 mg, 0.03 mmol, and 0.15 equiv.) and LiBr (69.5 mg) in a screw-capped vial 4 ml of DMA (unless otherwise noted) were added. The solution was stirred until the reagents were completely dissolved, and then amine (0.6 mmol, 3 equiv.) was added. Next, the mixture was transferred to a glass cell as fully as possible with the addition of aryl bromide (0.2 mmol, 1 equiv.). The teflon cap equipped with GC rod electrodes was placed on top of the cell; then the cap was sealed tightly with parafilm; the argon inlet and outlet (optional) were inserted into the corresponding holes in the cap. Thereafter, an argon inlet was immersed into the solution, and argon was bubbled through the solution for at least 5 minutes with moderate stirring. Then, the Ar inlet was set above the solution, and the position of the electrodes was adjusted to be as deep in the solution as possible (ca. 1 cm). The electric circuit was assembled as described in the "set-up preparation" section. The electrolysis was conducted for 4 hours with the following parameters of alternating current: sine waveform, 2 Hz frequency, 3V peak voltage, and a stirring rate of 1400 rpm.

After the electrolysis, 0.5 ml of the solution was transferred to a screw-capped vial, mixed with a small amount of Na₂H2EDTA (EDTA—Ethylenediaminetetraacetate) water solution (for Ni complexation), diluted with an aqueous solution of K₂CO₃ (0.1 M), and extracted with a Pentane/Et₂O (1/1 ratio) mixture. The extract was dried over Na₂SO₄, the solvent was evaporated carefully under vacuum (since some of the aryl bromides and products are quite volatile, soft conditions are required). Then, the residue was used to determine the NMR yield of the experiment. The remaining 3.5 ml of reaction mixture was diluted with an aqueous solution of K₂CO₃ (0.1 M) and extracted 4 times with a Pentane/Et₂O (1/1 ratio) mixture. The combined organic fractions were washed with a small amount of 0.1M NaCl water solution and dried over Na₂SO₄. Next, the solution was dried carefully under vacuum, the residue was dissolved in a minimum amount of hexane (with the addition of dichloromethane if needed) and subjected to column chromatography on SiO₂ to afford the desired product. The isolated yield in each case was calculated while considering the use of only 3.5 ml of solution for the isolation.

(B) With Amine Hydrochlorides as Substrates

To an Ar-flushed mixture containing NiBr₂·DME (6.2 mg, 0.02 mmol, 0.1 equiv.), di-$^t$BuBipy (8.1 mg, 0.03 mmol, 0.15 equiv.), amine hydrochloride (0.6 mmol, 3 equiv.), and LiBr (69.5 mg) in a screw-capped vial, 4 ml of DMA (unless otherwise noted) were added. The solution was stirred until the reagents were completely dissolved; the mixture was transferred to a glass cell as full as possible, with the addition of aryl bromide (0.2 mmol, 1 equiv.) and K₂CO₃ (138 mg, 1 mmol, 5 equiv.). The following procedure is identical to the one described herein above.

Synthesis and Characterization of Compounds Prepared by the Process of this Invention

4-(4-(trifluoromethyl)phenyl)morpholine (FIG. 3A, compound 7)

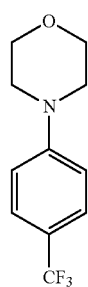

Prepared according to the procedure described in "General procedure for amination experiments (A)" section with morpholine (52.5 µL, 0.6 mmol, 3 equiv.) as amine and 4-bromobenzotrifluoride (28.0 µL, 0.2 mmol, 1 equiv.) as aryl bromide. Hexane-dichloromethane mixture with gradient (from pure hexane to 1:1 ratio, respectively) was used as an eluent. NMR yield—98%, isolated yield—75% (30.3 mg, white solid). The spectra data matched with values reported in the literature. (10)

Rf (dichloromethane)—0.59.

$^1$H NMR (500 Hz, CDCl₃): δ 7.50 (d, J=8.0 Hz, 2H), 6.92 (d, J=8.1 Hz, 2H), 3.87 (m, 4H), 3.24 (m, 4H). $^{13}$C NMR (125.8 Hz, CDCl₃): δ 153.5, 126.6 (q, J=3.8 Hz), 124.8 (q, J=269.9 Hz), 121.1 (q, J=33.4 Hz), 114.5, 66.8, 48.3. $^{19}$F NMR (282.4 Hz, CDCl₃): δ −62.39.

N-cyclohexyl-4-(trifluoromethyl)aniline (FIG. 3A, Compound 8)

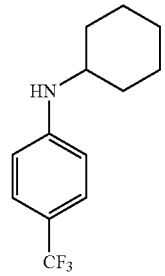

Prepared according to the procedure described in "general procedure for amination experiments (A)" section with cyclohexylamine (68.6 µL, 0.6 mmol, 3 equiv.) as amine and 4-bromobenzotrifluoride (28.0 µL, 0.2 mmol, 1 equiv.) as aryl bromide in DMF. Hexane was used as an eluent. NMR yield—91%, isolated yield—65% (27.7 mg, colorless liquid). The spectra data matched with values reported in the literature.

Rf (Hexane)—0.17. $^1$H NMR (500 Hz, CDCl₃): δ 7.37 (d, J=8.5 Hz, 2H), 6.57 (d, J=8.7 Hz, 2H), 3.88 (br, s, 1H), 3.29 (t, J=9.6, 1H), 2.05 (dd, J=12.8, 3.2 Hz, 2H), 1.78 (dt, J=13.6, 3.9 Hz, 2H), 1.69-1.65 (m, 1H), 1.43-1.34 (m, 2H), 1.28-1.14 (m, 3H). $^{13}$C NMR (100.6 Hz, CDCl₃): δ 149.9, 126.6 (q, J=3.9 Hz), 125.2 (q, J=270.1 Hz). 118.2 (q, J=32.6 Hz), 112.1, 51.5, 33.3, 25.9, 25.0. $^{19}$F NMR (470.6 Hz, CDCl₃): δ −61.88.

N-hexyl-4-(trifluoromethyl)aniline (FIG. 3A, Compound 9)

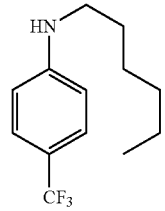

Prepared according to the procedure described in "General procedure for amination experiments (A)" section with 1-hexylamine (79.3 µL, 0.6 mmol, 3 equiv.) as amine and 4-bromobenzotrifluoride (28.0 µL, 0.2 mmol, 1 equiv.) as aryl bromide in DMF. Hexane was used as an eluent. NMR yield—82%, isolated yield—75% (32.2 mg, colorless liquid). The spectra data matched with values reported in the literature. (2)

Rf (Hexane)—0.17. $^1$H NMR (500 Hz, CDCl₃): δ 7.39 (d, J=8.5 Hz, 2H), 6.58 (d, J=8.7 Hz, 2H), 3.94 (br, s, 1H), 3.14 (m, 2H), 1.63 (p, J=7.4, 2H), 1.43-1.30 (m, 6H), 0.92-0.89 (m, 3H). $^{13}$C NMR (125.8 Hz, CDCl₃): δ 151.0, 126.7 (q, J=3.8 Hz), 125.2 (q, J=269.9 Hz), 118.5 (q, J=32.4 Hz), 111.8, 43.7, 31.7, 29.4, 26.9, 22.8, 14.2. $^{19}$F NMR (282.4 Hz, CDCl₃): δ −61.90.

N,N-dimethyl-4-(trifluoromethyl)aniline (FIG. 3A, Compound 10)

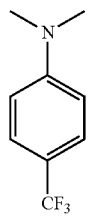

Prepared according to the procedure described in "General procedure for amination experiments (B)" section with dimethylamine hydrochloride (48.9 mg, 0.6 mmol, 3 equiv.) as amine hydrochloride and 4-bromobenzotrifluoride (28.0 µL, 0.2 mmol, 1 equiv.) as aryl bromide. Hexane was used as an eluent. NMR yield—86%, isolated yield—71% (23.5 mg, white solid). The spectra data matched with values reported in the literature.

Rf (Hexane)—0.24. $^1$H NMR (500 Hz, CDCl$_3$): δ 7.46 (d, J=8.8 Hz, 2H), 6.70 (d, J=8.8 Hz, 2H), 3.01 (s, 6H). $^{13}$C NMR (100.6 Hz, CDCl$_3$): δ 152.4, 126.5 (q, J=3.9 Hz), 125.3 (q, J=270.1 Hz), 117.7 (q, J=32.6 Hz), 111.3, 40.3. $^{19}$F NMR (282.4 Hz, CDCl$_3$): δ −61.81.

Methyl (4-(trifluoromethyl)phenyl)glycinate (FIG. 3A, Compound 11)

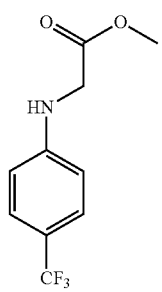

Prepared according to the procedure described in "General procedure for amination experiments (B)" section with glycine methyl ester hydrochloride (75.3 mg, 0.6 mmol, 3 equiv.) as amine hydrochloride and 4-bromobenzotrifluoride (28.0 µL, 0.2 mmol, 1 equiv.) as aryl bromide. Hexane-dichloromethane mixture with gradient (from pure hexane to 1:1 ratio, respectively) was used as an eluent. NMR yield—71%, isolated yield—35% (14.3 mg, white solid). The spectra data matched with values reported in the literature. Rf (dichloromethane)—0.61. $^1$H NMR (500 Hz, CDCl$_3$): δ 7.43 (d, J=8.4 Hz, 2H), 6.61 (d, J=8.4 Hz, 2H), 4.61 (s, 1H), 3.95 (d, J=5.2 Hz, 2H), 3.81 (s, 3H). $^{13}$C NMR (100.6 Hz, CDCl$_3$): δ 171.1, 149.5, 126.9 (q, J=3.9 Hz), 125.0 (q, J=270.5 Hz), 120.0 (q, J=32.8 Hz), 112.3, 52.6, 45.2. $^{19}$F NMR (270.6 Hz, CDCl$_3$): δ −62.18.

4-phenylmorpholine (FIG. 3A, Compound 2)

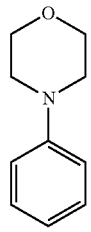

Prepared according to the procedure described in "General procedure for amination experiments (A)" section with morpholine (52.5 µL, 0.6 mmol, 3 equiv.) as amine and bromobenzene (21.3 µL, 0.2 mmol, 1 equiv.) as aryl bromide. Hexane-dichloromethane mixture with gradient (from pure hexane to 1:1 ratio, respectively) was used as an eluent. NMR yield—99%, isolated yield—74% (21.1 mg, white solid). The spectra data matched with values reported in the literature. Rf (dichloromethane)—0.65. $^1$H NMR (500 Hz, CDCl$_3$): δ 7.33-7.26 (m, 2H), 6.95-6.86 (m, 3H), 3.87 (t, J=4.0 Hz, 4H), 3.17 (t, J=4.0 Hz, 4H). $^{13}$C NMR (100.6 Hz, CDCl$_3$): δ 151.4, 129.3, 120.2, 115.9, 67.1, 49.5.

4-morpholinobenzonitrile (FIG. 3A, Compound 12)

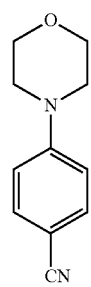

Prepared according to the procedure described in "General procedure for amination experiments (A)" section with morpholine (52.5 µL, 0.6 mmol, 3 equiv.) as amine and 4-bromobenzonitrile (36.4 mg, 0.2 mmol, 1 equiv.) as aryl bromide. Hexane-dichloromethane mixture with gradient (from pure hexane to 1:1 ratio, respectively) was used as an eluent. NMR yield—79%, isolated yield—58% (19.1 mg, white solid). The spectra data matched with values reported in the literature. (32)

Rf (dichloromethane)—0.68. $^1$H NMR (400 Hz, CDCl$_3$): δ 7.54-7.47 (m, 2H), 6.89-6.82 (m, 2H), 3.85 (t, J=4.9 Hz, 4H), 3.27 (t, J=4.9 Hz, 4H). $^{13}$C NMR (100.6 Hz, CDCl$_3$): δ 153.6, 133.6, 120.0, 114.2, 101.0, 66.6, 47.4.

Methyl 4-morpholinobenzoate (FIG. 3A, Compound 13)

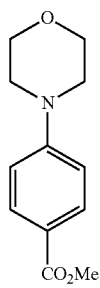

Prepared according to the procedure described in "General procedure for amination experiments (A)" section with morpholine (52.5 μL, 0.6 mmol, 3 equiv.) as amine and methyl 4-bromobenzoate (43.0 mg, 0.2 mmol, 1 equiv.) as aryl bromide. Hexane-dichloromethane mixture with gradient (from pure hexane to 1:1 ratio, respectively) was used as an eluent. NMR yield—86%, isolated yield—75% (29.0 mg, white solid). The spectra data matched with values reported in the literature.

Rf (dichloromethane)—0.4. $^1$H NMR (500 Hz, CDCl$_3$): δ 7.94 (d, J=8.3 Hz, 2H), 6.86 (d, J=8.3 Hz, 2H), 3.90-3.82 (m, 7H), 3.28 (m, 4H). $^{13}$C NMR (125.8 Hz, CDCl$_3$): b δ 167.2, 154.4, 131.3, 120.5, 113.6, 66.7, 51.8, 47.9.

4-(naphthalen-2-yl)morpholine (FIG. 3A, Compound 14)

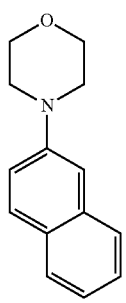

Prepared according to the procedure described in "General procedure for amination experiments (A)" section with morpholine (52.5 μL, 0.6 mmol, 3 equiv.) as amine and 2-bromonaphtalene (41.4 mg, 0.2 mmol, 1 equiv.) as aryl bromide. Hexane-dichloromethane mixture with gradient (from pure hexane to 1:1 ratio, respectively) was used as an eluent. NMR yield—75%, isolated yield—52% (19.4 mg, white solid). The spectra data matched with values reported in the literature. Rf (dichloromethane)—0.52. $^1$H NMR (500 Hz, CDCl$_3$): δ 7.77-7.68 (m, 3H), 7.45-7.40 (m, 1H), 7.34-7.39 (m, 1H), 7.27 (dd, J=8.9 Hz, J=2.5 Hz, 1H), 7.13 (d, J=2.2 Hz, 1H), 3.92 (t, J=4.8 Hz, 4H), 3.27 (t, J=4.8 Hz, 4H). $^{13}$C NMR (125.8 Hz, CDCl$_3$): δ 149.2, 134.7, 129.0, 128.8, 127.6, 126.9, 126.5, 123.7, 119.0, 110.2, 67.1, 49.9.

4-(o-tolyl)morpholine (FIG. 3A, Compound 15)

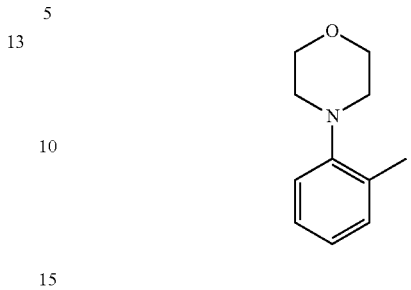

Prepared according to the procedure described in "General procedure for amination experiments (A)" section with morpholine (52.5 μL, 0.6 mmol, 3 equiv.) as amine and 2-bromotoluene (24.1 μL, 0.2 mmol, 1 equiv.) as aryl bromide. Hexane-dichloromethane mixture with gradient (from pure hexane to 1:1 ratio, respectively) was used as an eluent. NMR yield—82%, isolated yield—61% (18.9 mg, colorless liquid). The spectra data matched with values reported in the literature.

Rf (dichloromethane)—0.57. $^1$H NMR (400 Hz, CDCl$_3$): δ 7.23-7.17 (m, 2H), 7.07-6.98 (m, 2H), 3.87 (t, J=4.5 Hz, 4H), 2.93 (t, J=4.5 Hz, 4H), 2.34 (s, 3H). $^{13}$C NMR (100.6 Hz, CDCl$_3$): δ 151.4, 132.7, 131.3, 126.8, 123.5, 119.1, 67.6, 52.4, 87.0.

4-(pyridin-3-yl)morpholine (FIG. 3A, Compound 16)

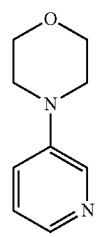

Prepared according to the procedure described in "General procedure for amination experiments (A)" section with morpholine (52.5 μL, 0.6 mmol, 3 equiv.) as amine and 3-bromopyridine (19.3 μL, 0.2 mmol, 1 equiv.) as aryl bromide. The whole mixture was extracted with ethel acetate 4 times. Combined organic fractions were washed with small amount of 0.1M NaCl water solution and dried over Na$_2$SO$_4$. Next, the solution was dried carefully under vacuum, the residue dissolved in the minimum amount of dichloromethane and subjected to column chromatography on SiO$_2$ (dichloromethane/diethyl ether mixture with gradient—from pure dichloromethane to pure diethyl ether) to furnish the product. Isolated yield—65% (from the whole reaction mixture, 21.3 mg, yellowish liquid). The spectra data matched with values reported in the literature. Rf (diethyl ether)—0.22. $^1$H NMR (500 Hz, CDCl$_3$): δ 8.29 (s, 1H), 8.14-8.10 (m, 1H), 7.19-7.14 (m, 2H), 3.90-3.83 (m, 4H), 3.22-3.15 (m, 4H). $^{13}$C NMR (125.8 Hz, CDCl$_3$): δ 147.0, 141.2, 138.4, 123.7, 122.3, 66.8, 48.7.

4-(3-methoxyphenyl)morpholine (FIG. 3A, Compound 17)

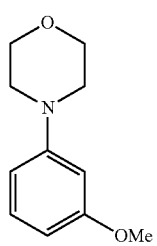

Prepared according to the procedure described in "General procedure for amination experiments (A)" section with morpholine (52.5 µL, 0.6 mmol, 3 equiv.) as amine and 3-bromoanisole (25.3 µL, 0.2 mmol, 1 equiv.) as aryl bromide. Hexane-dichloromethane mixture with gradient (from pure hexane to 1:1 ratio, respectively) was used as an eluent. NMR yield—86%, isolated yield—67% (22.7 mg, colorless liquid). The spectra data matched with values reported in the literature.

Rf (dichloromethane)—0.43. $^1$H NMR (500 Hz, CDCl$_3$): δ 7.24-7.16 (m, 1H), 6.56-6.50 (m, 1H), 6.48-6.42 (m, 2H), 3.85 (t, J=4.8 Hz, 4H), 3.80 (s, 3H), 3.15 (t, J=4.8 Hz, 4H). $^{13}$C NMR (125.8 Hz, CDCl$_3$): δ 160.8, 152.9, 130.0, 108.6, 104.9, 102.4, 67.0, 55.4, 49.4.

Example 3

Esterification Using the Process of this Invention

TABLE 2

Figure 2C:
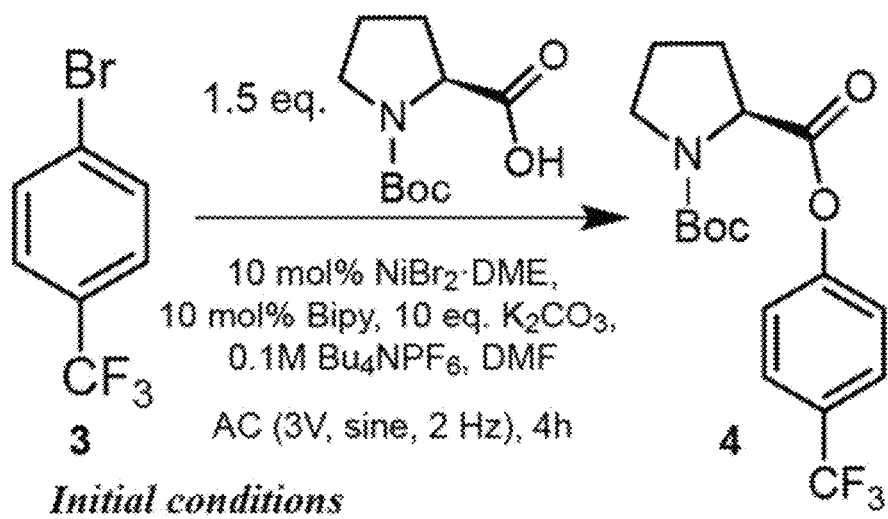

Reaction conditions for esterification (See FIG. 2C):

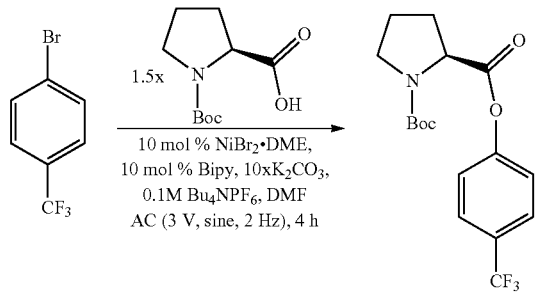 [SMILES: FC(F)(F)c1ccc(Br)cc1 ; CC(C)(C)OC(=O)N1CCC[C@H]1C(=O)O ; CC(C)(C)OC(=O)N1CCC[C@H]1C(=O)Oc1ccc(C(F)(F)F)cc1]

| Deviations from the initial conditions | | NMR yield |
|---|---|---|
| | None | 71% |
| Base | 1.5xQuinuclidine | 22% |
| | 1.5x$^t$BuOK | 45% |
| | 3xK$_2$CO$_3$ | 68% |
| | 10xNa$_2$CO$_3$ | 63% |
| | 10xK$_3$PO$_4$ | 64% |
| Ligand | 10 mol % di-$^t$BuBipy | 37% |
| | 10 mol % BPhen | 24% |
| | 10 mol % dppe | 0% |
| Amount of ligand | 5 mol % Bipy | 70% |
| | 15 mol % Bipy | 56% |
| Sup. electrolyte | 0.2M LiBr | Traces |
| | 0.1M Bu$_4$NI | 0% |
| Solvent | DMA | 84% |
| | MeCN | 37% |
| Frequency | 0.5 Hz | 61% |

TABLE 2-continued

Reaction conditions for esterification (See FIG. 2C):

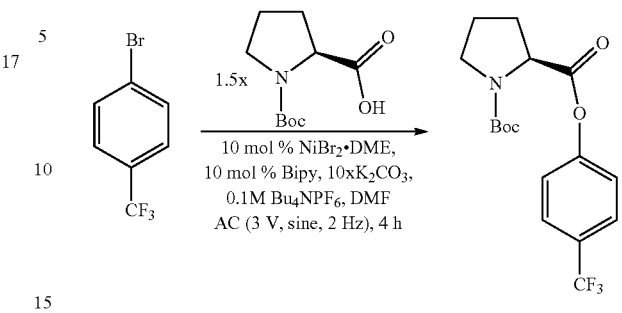

| Deviations from the initial conditions | | NMR yield |
|---|---|---|
| (in DMA) | 5 Hz | 33% |
| Temperature (DMA) | 60° C. | 87% |
| DC (DMA, 60° C.) | 2.8 V | 13% (22% Ar$_2$) |
| No current (DMA, 60° C.) | | 0% |

*Ar$_2$ stands for 4,4'-bis(trifluoromethyl)-1,1'-biphenyl; dppe stands for 1,2-Bis(diphenylphosphino)ethane General Procedure for the Esterification Process To an Ar-flushed mixture containing NiBr$_2$·DME (6.2 mg, 0.02 mmol, and 0.1 equiv.), Bipy (3.1 mg, 0.02 mmol, and 0.1 equiv.), carboxylic acid (0.3 mmol, 1.5 equiv.) (unless otherwise noted) and Bu$_4$NPF$_6$ (155 mg) in a screw-capped vial 4 ml of DMA were added. The solution was stirred until the reagents were completely dissolved; thereafter, the mixture was transferred to a glass cell as fully as possible with the addition of aryl bromide (0.2 mmol, 1 equiv.) and K$_2$CO$_3$ (276 mg, 10 equiv.) (unless otherwise noted). The teflon cap equipped with GC rod electrodes was placed on top of the cell; then the cap was sealed tightly with parafilm; the argon inlet and outlet (optional) were inserted into the corresponding holes in the cap. The temperature of the hotplate was set to 60° C. Next, the argon inlet was immersed into the solution, and argon was bubbled through the solution for at least 5 minutes with moderate stirring. Then, the Ar inlet was set above the solution, and the position of the electrodes was adjusted to be as deep in the solution as possible (ca. 1 cm). The electric circuit was assembled as described in the "Set-up preparation" section. The electrolysis was conducted for 4 hours (unless otherwise noted) with the following parameters of alternating current: sine waveform, 2 Hz frequency, 3V peak voltage, and a stirring rate of 200 rpm.

After the electrolysis, 0.5 ml of the solution was transferred to a screw-capped vial, mixed with a small amount of Na$_2$H2EDTA water solution (for Ni complexation), diluted with DI water, and extracted with a Pentane/Et$_2$O (1/1 ratio) mixture. The extract was dried over Na$_2$SO$_4$, and the solvent was evaporated carefully under vacuum. Then, the residue was used to determine the NMR yield of the experiment. The remaining 3.5 ml of the reaction mixture was carefully diluted with an aqueous solution of KH$_2$PO$_4$ (1 M) and extracted 4 times with a Pentane/Et$_2$O (1/1 ratio) mixture. The combined organic fractions were washed with a small amount of 0.1M NaCl water solution and dried over Na$_2$SO$_4$. Next, the solution was dried carefully under vacuum, the residue was dissolved in a minimum amount of hexane (with the addition of dichloromethane if needed) and subjected to column chromatography on SiO$_2$ to afford the desired product. The isolated yield in each case was calculated while considering the use of only 3.5 ml of solution for the isolation.

Synthesis and Characterization of Compounds Prepared by the Process of this Invention 4-(trifluoromethyl)phenyl benzoate (FIG. 3B, compound 18)

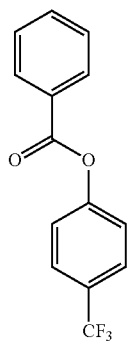

Prepared according to the procedure described in "General procedure for esterification experiments" section with benzoic acid (36.6 mg, 0.3 mmol, 1.5 equiv.) as carboxylic acid and 4-bromobenzotrifluoride (28.0 μL, 0.2 mmol, 1 equiv.) as aryl bromide. Hexane-dichloromethane mixture with gradient (from pure hexane to 10:1 ratio, respectively) was used as an eluent. NMR yield—81%, isolated yield—75% (34.9 mg, white solid). The spectra data matched with values reported in the literature. (22)

Rf (Hexane)—0.11. $^1$H NMR (500 Hz, CDCl$_3$): δ 8.25-8.18 (m, J=2H), 7.72 (d, J=7.3 Hz, 2H), 7.69-7.64 (m, 1H), 7.57-7.51 (m, 2H), 7.37 (d, J=7.2 Hz, 2H). $^{13}$C NMR (125.8 Hz, CDCl$_3$): δ 164.8, 153.6 (q, J=1.4 Hz) 134.1, 130.4, 129.1, 128.9, 128.3 (q, J=33.4 Hz), 127.0 (q, J=3.8 Hz), 124.0 (q, J=271.8 Hz), 122.4. $^{19}$F NMR (282.4 Hz, CDCl$_3$): δ −63.18.

5-(tert-butyl) 1-(4-(trifluoromethyl)phenyl) (tert-butoxycarbonyl)-L-glutamate (FIG. 3B, Compound 19)

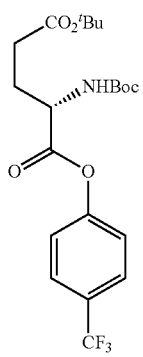

Prepared according to the procedure described in "General procedure for esterification experiments" section with Boc-L-glutamic acid 5-tert-butyl ester (61.0 mg, 0.3 mmol, 1.5 equiv.) as carboxylic acid and 4-bromobenzotrifluoride (28.0 μL, 0.2 mmol, 1 equiv.) as aryl bromide. Hexane-dichloromethane mixture with gradient (from pure hexane to 1:1 ratio, respectively) was used as an eluent. NMR yield—82%, isolated yield—66% (51.7 mg, white solid).

Rf (dichloromethane)—0.45. $^1$H NMR (500 Hz, CDCl$_3$): δ 7.66 (d, J=8.5 Hz, 2H), 7.25 (d, J=8.4 Hz, 2H), 5.20 (d, J=7.6 Hz, 1H), 4.53 (m, 1H), 2.50-2.37 (m, 2H), 2.34-2.25 (m, 1H), 2.15-2.05 (m, 1H), 1.46 (m, 18H). $^{13}$C NMR (125.8 Hz, CDCl$_3$): δ 172.1, 170.9, 155.6, 153.1, 128.6 (q, J=33.4 Hz), 127.0 (q, J=3.8 Hz), 123.9 (q, J=272.8 Hz), 122.1, 81.3, 80.5, 53.6, 31.7, 28.4, 28.2, 27.3. $^{19}$F NMR (282.4 Hz, CDCl$_3$): δ −63.27.

Methyl (4-(trifluoromethyl)phenyl) succinate (FIG. 3B, Compound 20)

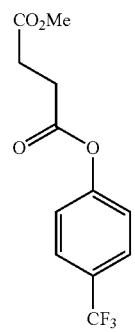

Prepared according to the procedure described in "General procedure for esterification experiments" section with succinic acid methyl ester (39.6 mg, 0.3 mmol, 1.5 equiv.) as carboxylic acid and 4-bromobenzotrifluoride (28.0 μL, 0.2 mmol, 1 equiv.) as aryl bromide. Hexane-dichloromethane mixture with gradient (from pure hexane to 1:1 ratio, respectively) was used as an eluent. NMR yield—84%, isolated yield—70% (33.8 mg, colorless liquid).

Rf (dichloromethane)—0.67. $^1$H NMR (500 Hz, CDCl$_3$): δ 7.65 (d, J=7.8 Hz, 2H), 7.23 (d, J=8.0 Hz, 2H), 3.73 (s, 3H), 2.93-2.86 (m, 2H), 2.78-2.75 (m, 2H). $^{13}$C NMR (125.8 Hz, CDCl$_3$): δ 172.6, 170.6, 153.2, 128.3 (q, J=33.4 Hz), 126.9 (q, J=3.8 Hz), 124.0 (q, J=271.8 Hz), 122.16, 52.17, 29.4, 28.9. $^{19}$F NMR (470.6 Hz, CDCl$_3$): δ −63.26.

4-(trifluoromethyl)phenyl acetate (FIG. 3B, Compound 21)

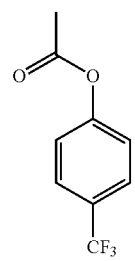

Prepared according to the procedure described in "General procedure for esterification experiments" section with sodium acetate suspension (82.0 mg, 1 mmol, 5 equiv.) instead of carboxylic acid and K₂CO₃ mixture, and 4-bromobenzotrifluoride (28.0 μL, 0.2 mmol, 1 equiv.) as aryl bromide. Hexane-dichloromethane mixture with gradient (from pure hexane to 1/1 ratio, respectively) was used as an eluent. NMR yield—87%, isolated yield—48% (17.1 mg, colorless liquid). The spectra data matched with values reported in the literature.

Rf (dichloromethane)—0.65. $^1$H NMR (500 Hz, CDCl$_3$): δ 7.65 (d, J=8.5 Hz, 2H), 7.22 (d, J=8.5 Hz, 2H), 2.33 (s, 3H). $^{13}$C NMR (125.8 Hz, CDCl$_3$): δ 169.0, 153.3, 128.3 (q, J=32.4 Hz), 126.9 (q, J=3.8 Hz), 124.0 (q, J=271.8 Hz), 122.2, 21.2. $^{19}$F NMR (282.4 Hz, CDCl$_3$): δ −63.25.

1-(tert-butyl) 2-(4-(trifluoromethyl)phenyl) (S)-pyrrolidine-1,2-dicarboxylate (FIG. 3B, Compound 4)

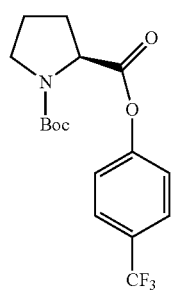

4

Prepared according to the procedure described in "General procedure for esterification experiments" section with Boc-L-proline (64.6 mg, 0.3 mmol, 1.5 equiv.) as carboxylic acid and 4-bromobenzotrifluoride (28.0 μL, 0.2 mmol, 1 equiv.) as aryl bromide. Hexane-dichloromethane mixture with gradient (from pure hexane to 1/1 ratio, respectively) was used as an eluent. NMR yield—87%, isolated yield—69% (43.4 mg, colorless liquid). The spectra data matched with values reported in the literature.

Rf (dichloromethane)—0.37. $^1$H NMR (500 Hz, CDCl$_3$): (rotameric mixture, resonances for minor rotamer are enclosed in parenthesis) δ 7.67 (7.64) (d, J=8.4 Hz, 2H), 7.25 (7.23) (d, J=8.7 Hz, 2H), 4.53 (4.47) (dd, J=8.7, 4.4 Hz, 1H), 3.67-3.40 (m, 2H), 2.45-2.29 (m, 1H), 2.22-2.10 (m, 1H), 2.09-1.90 (m, 2H), (1.48) 1.46 (s, 9H). $^{13}$C NMR (125.8 Hz, CDCl$_3$): (rotameric mixture, resonances for minor rotamer are enclosed in parenthesis) δ (171.4) 171.3, (154.6) 153.8, (153.5) 153.2, 128.4 (128.2) (d, J=33.4 Hz), 127.0 (126.8) (q, J=3.8 Hz), (123.8) 123.9 (d, J=271.8 Hz), (122.2) 121.8, 80.5 (80.4), 59.3 (59.2), (46.8) 46.6, 31.2 (30.1), 28.6, (24.7) 23.9. $^{19}$F NMR (282.4 Hz, CDCl$_3$): (rotameric mixture, resonances for minor rotamer are enclosed in parenthesis) δ −63.22 (−63.27).

1-(tert-butyl) 2-(4-(methoxycarbonyl)phenyl) (S)-pyrrolidine-1,2-dicarboxylate (FIG. 3B, Compound 22)

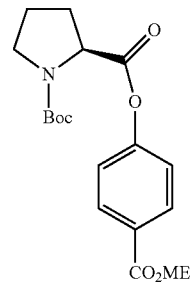

22

Prepared according to the procedure described in "General procedure for esterification experiments" section with Boc-L-proline (64.6 mg, 0.3 mmol, 1.5 equiv.) as carboxylic acid and methyl 4-bromobenzoate (43.0 mg, 0.2 mmol, 1 equiv.) as aryl bromide. Hexane-dichloromethane mixture with gradient (from pure hexane to pure dichloromethane) was used as an eluent. NMR yield—89%, isolated yield—79% (48.3 mg, white solid). The spectra data matched with values reported in the literature. (36)

Rf (dichloromethane)—0.2. $^1$H NMR (500 Hz, CDCl$_3$): (rotameric mixture, resonances for minor rotamer are enclosed in parenthesis) δ 8.08 (8.05) (d, J=8.4 Hz, 2H), 7.2 (7.18) (d, J=8.5 Hz, 2H), (4.53) 4.46 (dd, J=8.5, 4.3 Hz, 1H), 3.91 (3.90) (s, 3H), 3.69-3.40 (m, 2H), 2.47-2.28 (m, 1H), 2.23-2.11 (m, 1H), 2.10-1.90 (m, 2H), (1.48) 1.45 (s, 9H). $^{13}$C NMR (125.8 Hz, CDCl$_3$): δ (rotameric mixture, resonances for minor rotamer are enclosed in parenthesis) (171.3) 171.25, (166.5) 166.4, (154.6) 154.3, 153.8, 131.4 (131.3), 128.0 (127.8), (121.7) 121.3, 80.5 (80.3), 59.3 (59.2), 52.4 (52.3), (46.8), 46.6, 31.2 (30.1), 28.6, (24.7) 23.9.

1-(tert-butyl) 2-(4-cyanophenyl) (S)-pyrrolidine-1,2-dicarboxylate (FIG. 3B, Compound 23)

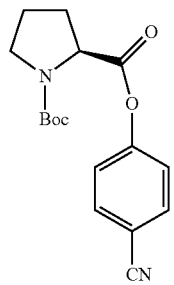

23

Prepared according to the procedure described in "General procedure for esterification experiments" section with Boc-L-proline (64.6 mg, 0.3 mmol, 1.5 equiv.) as carboxylic acid and 4-bromobenzonitrile (36.4 mg, 0.2 mmol, 1 equiv.)

as aryl bromide. Hexane-dichloromethane mixture with gradient (from pure hexane to pure dichloromethane) was used an eluent. NMR yield—65%, isolated yield—45% (24.9 mg, colorless liquid). The spectra data matched with values reported in the literature. (36)

Rf (dichloromethane) –0.2.1H NMR (500 Hz, CDCl$_3$): (rotameric mixture, resonances for one of the rotamers are enclosed in parenthesis) δ 7.70 (7.67) (d, J=8.5 Hz, 2H), 7.26 (7.24) (d, J=8.7 Hz, 2H), 4.51 (4.46) (dd, J=8.5, 4.5 Hz, 1H), 3.67-3.41 (m, 2H), 2.45-2.30 (m, 1H), 2.20-1.90 (m, 3H), 1.47 (1.44) (s, 9H). $^{13}$C NMR (125.8 Hz, CDCl$_3$): (rotameric mixture, resonances for one of the rotamers are enclosed in parenthesis) δ (171.1) 171.0, (154.6) 154.3, 154.0 (153.7) 133.9 (133.8), (122.8) 122.4, (118.4) 118.2, (110.1) 109.9, 80.6 (80.4), 59.3 (59.2), (46.8) 46.6, (31.2) 30.1, 28.5, (24.7) 23.9.

1-(tert-butyl) 2-(naphthalen-2-yl) (S)-pyrrolidine-1,2-dicarboxylate (FIG. 3B, Compound 24)

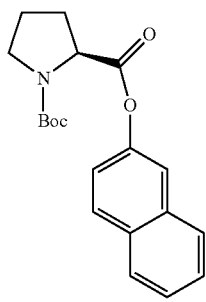

Prepared according to the procedure described in "General procedure for esterification experiments" section with Boc-L-proline (64.6 mg, 0.3 mmol, 1.5 equiv.) as carboxylic acid and 2-bromonaphtalene (41.4 mg, 0.2 mmol, 1 equiv.) as aryl bromide. Hexane-dichloromethane mixture with gradient (from pure hexane to 1/1 ratio, respectively) was used as an eluent. NMR yield—79%, isolated yield—54% (32.3 mg, yellowish liquid).

Rf (dichloromethane)—0.36. $^1$H NMR (300 Hz, CDCl$_3$): (rotameric mixture, resonances for minor rotamer are enclosed in parenthesis) δ 7.92-7.75 (m, 3H), 7.62-7.4 (m, 3H), 7.32-7.18 (m, 1H), 4.59 (4.51) (dd, J=8.4, 4.0 Hz, 1H), 3.75-3.40 (m, 2H), 2.51-1.9 (m, 4H), 1.50 (m, 9H). C NMR (100.6 Hz, CDCl$_3$): (rotameric mixture, resonances for minor rotamer are enclosed in parenthesis) (171.93) 171.89, (154.7) 153.9, (148.6) 148.4, 133.8, 131.6, 129.6 (129.5), 127.91 (127.87), 127.75, 126.8 (126.6), 125.9 (125.8), (121.2) 120.7, (118.6) 118.2, 80.4 (80.2), 59.4 (59.3), 46.8 (46.6), 31.2 (30.2), 28.6, (24.7) 23.9.

Example 4

Etherification Using the Process of this Invention

TABLE 3

Figure 2D:
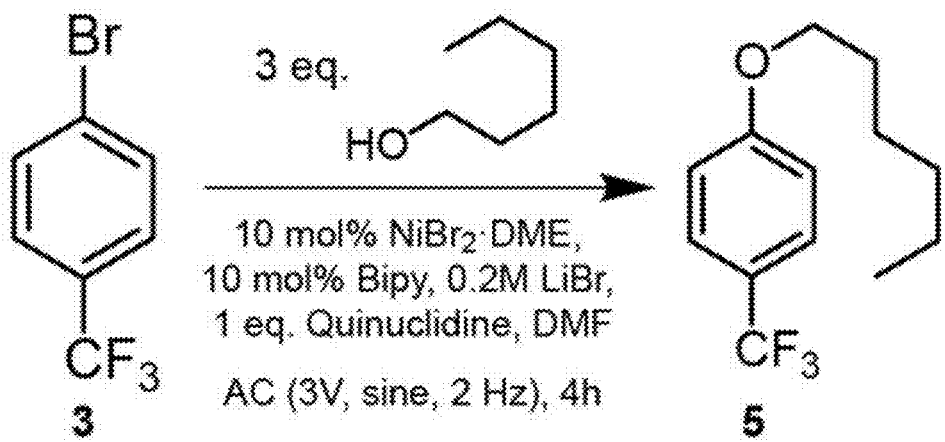

Reaction conditions for etherification (See FIG. 2D):

Br-C$_6$H$_4$-CF$_3$ + 3x$^n$HexOH → (HexO)-C$_6$H$_4$-CF$_3$ 10 mol % NiBr$_2$·DME, 10 mol % Bipy, 0.2M LiBr, 1xQuinuclidine, DMF
AC (3 V, sine, 2 Hz), 4 h

| Deviations from the initial conditions | | NMR yield |
|---|---|---|
| None | | 49% |
| Base | 1xDABCO | 10% |
| | 1x$^t$BuOK | 0% |
| Ligand | 10 mol % di-$^t$BuBipy | 26% |
| Amount of ligand | 5 mol % Bipy | 45% |
| | 20 mol % Bipy | 17% |
| Solvent | DMA | 32% |
| | MeCN | 27% |
| Temperature | 60° C. | 26% |
| Amount of catalyst | 15 mol % NiBr$_2$·DME, 15 mol % Bipy | 51% |
| Amount of base | 2xQuinuclidine | 64% (2% Ar$_2$) |
| Frequency (2xQuinuclidine) | 0.5 Hz | 42% (13% Ar$_2$) |
| | 5 Hz | 77% (1% Ar$_2$) |
| | 10 Hz | 70% (No Ar$_2$) |
| | 25 Hz | 56% (No Ar$_2$) |
| DC (2xQuiuclidine) | 2.8 V | 26% (69% Ar$_2$) |
| No current (2xQuinuclidine) | | 0% |

DABCO stands for 1,4-diazabicyclo[2.2.2]octane

General Procedure for the Etherification Process

To an Ar-flushed mixture containing NiBr$_2$·DME (6.2 mg, 0.02 mmol, and 0.1 equiv.), Bipy (3.1 mg, 0.02 mmol, and 0.1 equiv.) and LiBr (69.5 mg) in a screw-capped vial 4 ml of DMF were added. The solution was stirred until the reagents were completely dissolved, and then quinuclidine (44.5 mg, 0.4 mmol, and 2 equiv.) and alcohol (0.6 mmol, 3 equiv.—unless otherwise noted) were added. Next, the mixture was transferred to a glass cell as full as possible with the addition of aryl bromide (0.2 mmol, 1 equiv.). The teflon cap equipped with GC rod electrodes was placed on top of the cell; then the cap was sealed tightly with parafilm; the argon inlet and outlet (optional) were inserted into the corresponding holes in the cap. Thereafter, an argon inlet was immersed into the solution, and argon was bubbled through the solution for at least 5 minutes with moderate stirring. Then, the Ar inlet was set above the solution, and the position of the electrodes was adjusted to be as deep in the solution as possible (ca. 1 cm). The electric circuit was assembled as described in the "Set-up preparation" section. The electrolysis was conducted for 8 hours (unless otherwise noted) with the following parameters of alternating current: a sine waveform, 10 Hz frequency (unless otherwise noted), 3V peak voltage, and a stirring rate of 200 rpm.

After the electrolysis, 0.5 ml of the solution was transferred to a screw-capped vial, mixed with a small amount of Na$_2$H2EDTA water solution (for Ni complexation), diluted with DI water, and extracted with a Pentane/Et$_2$O (1/1 ratio)

mixture. The extract was dried over Na$_2$SO$_4$; the solvent was evaporated carefully under vacuum. Then, the residue was used to determine the NMR yield of the experiment. The remaining 3.5 ml of reaction mixture was diluted with DI water and extracted 4 times with a Pentane/Et$_2$O (1/1 ratio) mixture. The combined organic fractions were washed with a small amount of 0.1M NaCl water solution and dried over Na$_2$SO$_4$. Next, the solution was dried carefully under vacuum, the residue was dissolved in a minimum amount of hexane or pentane, and subjected to column chromatography on SiO$_2$ to afford the desired product. The isolated yield in each case was calculated while considering the use of only 3.5 ml of solution for the isolation.

Synthesis and Characterization of Compounds Prepared by the Process of this Invention:

1-(benzyloxy)-4-(trifluoromethyl)benzene (FIG. 3C, compound 25)

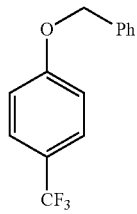

Prepared according to the procedure described in "General procedure for etherification experiments" section with benzyl alcohol (62.1 μL, 0.6 mmol, 3 equiv.) as alcohol and 4-bromobenzotrifluoride (28.0 μL, 0.2 mmol, 1 equiv.) as aryl bromide. Hexane was used as an eluent. NMR yield—72%, isolated yield—66% (29.1 mg, white solid). The spectra data matched with values reported in the literature. Rf (Hexane)—0.2. $^1$H NMR (400 Hz, CDCl$_3$): δ 7.55 (d, J=8.6 Hz, 2H), 7.47-7.33 (m, 5H), 7.04 (d, J=8.6 Hz, 2H), 5.12 (s, 2H). $^{13}$C NMR (100.6 Hz, CDCl$_3$): δ 161.3, 136.4, 128.9, 128.4, 127.6, 127.1 (q, J=3.7 Hz), 124.7 (q, J=271.1 Hz), 123.3 (q, J=32.6 Hz), 115.0, 70.3. $^{19}$F NMR (282.4 Hz, CDCl$_3$): δ −62.48.

1-(cyclohexyloxy)-4-(trifluoromethyl)benzene (FIG. 3C, compound 26)

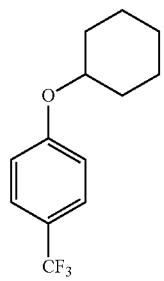

Prepared according to the procedure described in "General procedure for etherification experiments" section with cyclohexanol (126.8 μL, 1.2 mmol, 6 equiv.) as alcohol and 4-bromobenzotrifluoride (28.0 μL, 0.2 mmol, 1 equiv.) as aryl bromide. The electrolysis was conducted for 8 hours with the frequency of 5 Hz. Hexane was used as an eluent. NMR yield—65%, isolated yield—50% (21.4 mg, colorless liquid). The spectra data matched with values reported in the literature. Rf (Hexane)—0.48. $^1$H NMR (500 Hz, CDCl$_3$): δ 7.51 (d, J=8.5 Hz, 2H), 6.94 (d, J=8.5 Hz, 2H), 4.34-4.27 (m, 1H), 2.03-1.94 (m, 2H), 1.85-1.76 (m, 2H), 1.63-1.50 (m, 3H), 1.45-1.28 (m, 3H). $^{13}$C NMR (125.8 Hz, CDCl$_3$): δ 160.5, 127.0 (q, J=3.8 Hz), 124.7 (q, J=271.8 Hz), 122.5 (q, J=33.4 Hz), 115.7, 75.6, 31.7, 25.7, 23.8. $^{19}$F NMR (470.6 Hz, CDCl$_3$): δ −62.42.

1-isopropoxy-4-(trifluoromethyl)benzene (FIG. 3C, compound 27)

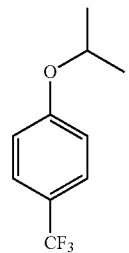

Prepared according to the procedure described in "General procedure for etherification experiments" section with 2-propanol (91.9 μL, 1.2 mmol, 6 equiv.) as alcohol and 4-bromobenzotrifluoride (28.0 μL, 0.2 mmol, 1 equiv.) as aryl bromide. The electrolysis was conducted for 16 hours with the frequency of 5 Hz. Pentane was used as an eluent. NMR yield—73%, isolated yield—62% (22.2 mg, colorless liquid). The spectra data matched with values reported in the literature. Rf (Hexane)—0.45. $^1$H NMR (500 Hz, CDCl$_3$): δ 7.52 (d, J=8.7 Hz, 2H), 6.93 (d, J=8.7 Hz, 2H), 4.61 (sept, J=6.1 Hz, 1H), 1.36 (d, J=6.1 Hz, 6H). $^{13}$C NMR (125.8 Hz, CDCl$_3$): δ 160.6, 127.03 (q, J=3.8 Hz), 124.7 (q, 270.8 Hz), 122.6 (q, 32.4 Hz), 115.6, 70.3, 22.0. $^{19}$F NMR (282.4 Hz, CDCl$_3$): δ −62.44.

1-(hexyloxy)-4-(trifluoromethyl)benzene (FIG. 3C, compound 5)

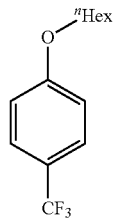

Prepared according to the procedure described in "General procedure for etherification experiments" section with 1-Hexanol (75.3 μL, 0.6 mmol, 3 equiv.) as alcohol and 4-bromobenzotrifluoride (28.0 μL, 0.2 mmol, 1 equiv.) as aryl bromide. Hexane was used as an eluent. NMR yield—87%, isolated yield—68% (29.3 mg, colorless liquid). The spectra data matched with values reported in the literature. Rf (Hexane)—0.56. $^1$H NMR (500 Hz, CDCl$_3$): δ 7.53 (d, J=8.4 Hz, 2H), 6.95 (d, J=8.4 Hz, 2H), 3.99 (t, J=6.5 Hz, 2H), 1.80 (tt, J=7.3, 6.7 Hz, 2H), 1.51-1.45 (m, 2H), 1.39-1.32 (m, 4H), 0.95-0.87 (m, 3H). $^{13}$C NMR (125.8 Hz, CDCl$_3$): δ 161.7, 127.0 (q, J=3.8 Hz), 124.7 (q, J=270.8 Hz), 122.7 (q, J=32.4 Hz), 114.6, 68.4, 31.7, 29.2, 25.8, 22.7, 14.2. $^{19}$F NMR (282.4 Hz, CDCl$_3$): δ −62.42.

Methyl 4-(hexyloxy)benzoate (FIG. 3C, Compound 28)

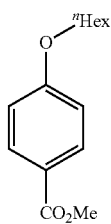

28

Prepared according to the procedure described in "General procedure for etherification experiments" section with 1-Hexanol (75.3 μL, 0.6 mmol, 3 equiv.) as alcohol and methyl 4-bromobenzoate (43.0 mg, 0.2 mmol, 1 equiv.) as aryl bromide. Hexane-dichloromethane mixture with gradient (from pure hexane to 1/1 ratio, respectively) was used as an eluent. NMR yield—85%, isolated yield—79% (32.7 mg, colorless liquid). The spectra data matched with values reported in the literature. Rf (dichloromethane)—0.7. $^1$H NMR (500 Hz, CDCl$_3$): δ 7.97 (d, J=8.9 Hz, 2H), 6.90 (d, J=8.9 Hz, 2H), 4.00 (t, J=6.6 Hz, 2H), 3.88 (s, 3H), 1.79 (m, 2H), 1.51-1.41 (m, 2H), 1.38-1.30 (m, 4H), 0.95-0.86 (m, 3H). $^{13}$C NMR (125.8 Hz, CDCl$_3$): δ 167.1, 163.1, 131.7, 122.5, 114.2, 68.4, 52.0, 31.7, 29.2, 25.8, 22.7, 14.2.

3-(hexyloxy)pyridine (FIG. 3C, compound 29)

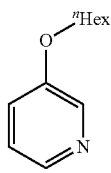

29

Prepared according to the procedure described in "General procedure for etherification experiments" section with 1-Hexanol (75.3 μL, 0.6 mmol, 3 equiv.) as alcohol and 3-bromopyridine (19.3 μL, 0.2 mmol, 1 equiv.) as aryl bromide. Hexane-dichloromethane mixture with gradient (from pure hexane to pure dichloromethane) was used as an eluent. NMR yield—66%, isolated yield—61% (19.1 mg, yellowish liquid). The spectra data matched with values reported in the literature. Rf (dichloromethane)—0.27. $^1$H NMR (500 Hz, CDCl$_3$): δ 8.30 (d, J=2.3, 1H), 8.20 (dd, J=4.3, 1.5 Hz, 1H), 7.23-7.15 (m, 2H), 3.99 (t, J=6.5 Hz, 2H), 1.83-1.75 (m, 2H), 1.51-1.42 (m, 2H), 1.40-1.29 (m, 4H), 0.91 (t, J=7.0 Hz, 3H). $^{13}$C NMR (125.8 Hz, CDCl$_3$): δ 155.4, 142.0, 138.2, 123.9, 121.2, 68.5, 31.7, 29.3, 25.8, 22.7, 14.2.

Example 5

Cyanation Using the Process of this Invention

The development of convenient and effective routes for the synthesis of aromatic nitriles from aryl halides stay of high importance nowadays. Being a quite frequent fragment of pharmaceuticals, natural products, dyes and herbicides, nitriles may also serve as convenient intermediates for the further conversion into a wide spectrum of useful functional groups allowing an access to amines, amides, acids, aldehydes and other compounds. In recent years, methods of nickel-catalyzed cyanation of aryl halides started to draw more attention as more effective compared to copper-based systems which usually require harsh conditions and stoichiometric loadings of catalyst, more cost-attractive than Pd-catalyzed cyanation reactions and rather tolerable to a wide range of other functional groups in the substrates in contrast to methods involving the use of arylmagnesium or -lithium reagents as intermediates. However, significant number of Ni-based cyanation systems consider the use of toxic sources of cyanide anion or HCN such as KCN, NaCN, Zn(CN)$_2$, TMSCN or cyanohydrins which may be troublesome in the sense of safety concerns especially in large-scale syntheses and, moreover, be the main reason of catalyst poisoning. Other reported methods utilize specific reagents which are not easily commercially accessible (e.g., 2-methyl-2-phenyl malononitrile (MPMN) or 1,4-bis(trimethylsilyl)-2,3,5,6-tetramethyl-1,4-dihydropyrazine (Si-Me$_4$-DHP)) or require careful handling (Al(Bu)$_3$)(FIG. 15A). Therefore, there is a strong need for new convenient routes for Ni-catalyzed cyanation which would use widely available, cheap, low-toxic and stable reagents, soft conditions and avoid handling with strong reductants and oxidizers.

In this example a novel method for alternating-current-assisted (AC-assisted) Ni-catalyzed cyanation of aryl halides is reported, employing malononitrile (MN) as cheap and low-toxic cyanide source (FIG. 15B—a). It was demonstrated herein that AC electrolysis can be highly effective in redox-neutral processes where coherent sequence of cathodic reduction and anodic oxidation is required for the product formation. Moreover, additional selectivity can be gained deriving from fast rate of electron transfer of the process. As described herein, AC electrolysis was successfully merged with transition-metal catalysis for numerous cross-coupling reactions which allowed to facilitate otherwise unfavorable mechanistic steps and, at the same time, maintain the catalytic cycle. In this example, AC was found crucial for the product formation allowing oxidative addition of aryl halides to low-valent nickel species together with activation of the malononitrile molecule. Previously, only two examples were shown for utilizing malononitrile in cyanation reactions of aryl halides. In the first one, Zhou and co-workers demonstrated the formation of aromatic nitriles from aryl iodides in copper-catalyzed conditions (FIG. 15B—b); in a second report, Cai's group extended the scope to aryl bromides by introducing Pd catalyst and using half-stoichiometric amounts of copper co-catalyst (FIG. 15B—c). Both conditions required the use of strong inorganic base ($^t$BuONa) together with high temperatures (120-130° C.). No other methods for the cyanation of aryl halides using unsubstituted malononitrile as a substrate have been previously reported.

Results and Discussion

First, the optimal conditions for the reaction of AC-assisted Ni-catalyzed cyanation of aryl halides were investigated (Table 4). All reactions were conducted on 0.2 mmol scale (aryl bromide) in 4 ml electrochemical cell equipped with two glassy carbon (GC) rod electrodes. A commercial waveform generator was used as AC supply while the measurements of voltage and current over the cell were performed using an oscilloscope. On initial steps, 4-Bromobenzotrifluoride and Methyl 4-Bromobenzoate were used as typical electron-deficient aryl bromides. In these examples, it was shown that the use of DBU (entry 3) instead of LiHMDS, strong inorganic base, allowed to increase the yields of the corresponding aryl nitriles. Moreover, increased temperatures (60° C.) (entry 2) and the use of increased concentrations of ligand (20 mol % Bpy) (entry 4) led to higher efficiencies of the reaction. In case of 4-Bromotoluene, slightly more elevated temperatures (80° C.) (entry 5) together with the switch to lithium bromide as electrolyte salt (entry 6) resulted in a yield of 50% for aromatic nitrile; however, lowering the selectivity (up to 10% of side products were observed in the reaction mixture). The use of pre-prepared nickel catalyst $Bpy_3Ni(C104)_2$ and increased amounts of base and malononitrile (3 equivalents) (entry 7) showed better stability of the system and higher selectivity (less than 3% of side products after 7 hours of reaction). The choice of $Bpy_3NiBr_2$ as the catalyst (entry 8) demonstrated significantly higher yield of the 4-Tolunitrile. Comparison to DC-assisted conditions (entry 9) indicates that AC is better suited for the discussed process.

Next, investigations of the scope of the reaction were performed using the found optimized conditions. It was already demonstrated that electron-deficient and non-activated aryl bromides (Table 4, FIG. 16, 1) allow to obtain the yield of aromatic nitrile over 60%; with extended time of the reaction, even better efficiency for these type of aryl halides is expected. As expected, reaction went smoothly for non-activated 4-Iodotoluene as well (FIG. 16, 2), no product was found in the reaction mixture with 4-Chlorotoluene (FIG. 16, 3). Surprisingly, 45% of yield was achieved in reaction with 4-Bromoanisole (FIG. 16, 4) meaning that the process is quite efficient for the aryl bromides bearing electron-donor group. 2-hours AC-electrolysis with sterically hindered 2-Bromotoluene (FIG. 16, 5) and electron-deficient 4-Chlorobenzotrifluoride (FIG. 16, 6) demonstrated the yields of 22% and 16%, respectively, indicating the need in additional adjustments of experimental conditions for these specific types of reagents.

The study of the mechanism of the described process is of particular interest. Qualitative deviations from the initial conditions lead to the sharp decrease in yields in some embodiments (see Table 5 herein below). For instance, the elimination of base from the reaction mixture completely stopped the reaction; thus, it can be speculated that the formation of Ni-MN complex or anodic oxidation of MN anion may have importance for the further elimination of cyanide anion. At the same time, the use of reductive conditions (DC, Zn sacrificial anode, 2 mA), which favor the nucleophilic attack to nitrile group of MN by Ni-aryl complexes, showed 10% of yield indicating that it may be a minor pathway in the total mechanism of cyanation under standard conditions. Finally, yield of 5% was obtained while keeping room temperature during the electrolysis—here, increased temperature may help not only in the activation of the aryl halide but also in the formation of oligomeric species of malononitrile which may potentially be a source of cyanide anion.

Further and first, the final adjustments of the optimized conditions are performed—more supporting electrolytes (TBABr, LiCl, TBAI), bases (Quinuclidine, DABCO, $Et_3N$) and temperature conditions are investigated in order to find the most appropriate combination for the highest efficiency and selectivity of the reaction; additional investigation for challenging substrates (sterically hindered aryl bromides and electron-deficient aryl chlorides) are included. The analysis of the relationship between frequency and the yields of aromatic nitrile and thorough comparison of the results of DC- and AC-assisted experiments are also important. The investigation of scope is performed to include electron-deficient, non-activated and activated aryl and heteroaryl iodides and bromides together with electron-deficient aryl chlorides (FIG. 17).

Mechanistical studies of the reaction are performed. Because of the existence of rather large number of possible pathways for aryl nitrile formation, it is expected that several minor and one major mechanistic pathway contribute in the total process; the elucidation of the major pathway may be considered as the main aim of the mechanistic studies. Without being bound to any theory, it is noted that there are two main possibilities for the formation of Ar—CN bond: nucleophilic attack to nitrile group of MN by Ni-aryl complexes and reductive elimination of ArCN from $L_nNiArCN$ complexes. In a second case, cyanide formation may occur through, at least, oxidative addition of MN, reductive decyanation of MN, base- or oxidation-induced oligomerization of MN and its following transformations.

Large-scale synthesis of some aromatic nitriles—in particular, pharmaceuticals, their derivatives or precursors—demonstrates the applicability of the suggested process for the preparative/industrial synthesis of the selected aromatic nitriles.

Proposed advantages of this route include but are not limited to efficient, selective and convenient synthesis of aromatic nitriles using e.g. malononitrile as substrate—a cheap, low-toxic and widely available compound; Cheap and air- and moisture-stable nickel precatalyst; The use of alternating current enhances the efficiency of the electrolysis in comparison to direct current.

TABLE 4

Optimization of the conditions of AC-assisted Ni-catalyzed cyanation.

ArBr (R-C6H4-Br) + x eq. NC-CH2-CN → ArCN (R-C6H4-CN)

Conditions: Catalyst/Ligand, Base, Sup. electrolyte, DMA, Temperature, AC

| Entry | ArBr | Catalyst/Ligand | Base (Base/MN equiv-s) | Supporting electrolyte | T, °C | Frequency/Peak voltage/Waveform | Time | NMR yield |
|---|---|---|---|---|---|---|---|---|
| 1 | (4-F$_3$C)PhBr | 10% DMENiBr$_2$ 10% Bpy | LiHMDS (2/2) | 0.1M TBAPF$_6$ | RT | 2 Hz/3 V/ Sine | 4 h | 23% |
| 2 | (4-F$_3$C)PhBr (4-MeO$_2$C)PhBr | 10% DMENiBr$_2$ 10% Bpy | LiHMDS (2/2) | 0.1M TBAPF$_6$ | 60° C. | 2 Hz/3 V/ Sine | 4 h | 40% 38% |
| 3 | (4-MeO$_2$C)PhBr | 10% DMENiBr$_2$ 10% Bpy | DBU (2/2) | 0.1M TBAPF$_6$ | 60° C. | 2 Hz/3 V/ Sine | 4 h | 46% |
| 4 | (4-MeO$_2$C)PhBr 4-TolBr | 10% DMENiBr$_2$ 20% Bpy | DBU (2/2) | 0.1M TBAPF$_6$ | 60° C. | 2 Hz/2.8 V/ Square | 4 h | 66% 22% |
| 5 | 4-TolBr | 10% DMENiBr$_2$ 20% Bpy | DBU (2/2) | 0.1M TBAPF$_6$ | 80° C. | 4 Hz/2.8 V/ Square | 4 h | 42% |
| 6 | 4-TolBr | 10% DMENiBr$_2$ 20% Bpy | DBU (2/2) | 0.2M LiBr | 80° C. | 4 Hz/2.8 V/ Square | 4 h | 50% |
| 7 | 4-TolBr | 10% Bpy$_3$Ni(ClO$_4$)$_2$ | DBU (3/3) | 0.2M LiBr | 80° C. | 4 Hz/2.8 V/ Square | 4 h 7 h | 52% 68% |
| 8 | 4-TolBr | 10% Bpy$_3$NiBr$_2$ | DBU (2/2) | 0.2M LiBr | 80° C. | 4 Hz/2.8 V/ Square | 6 h | 83% |
| 9 | 4-TolBr | 10% Bpy$_3$NiBr$_2$ | DBU (2/2) | 0.2M LiBr | 80° C. | DC/2 mA | 4 h | 25% |

TABLE 5

Initial mechanistic studies of AC-assisted Ni-catalyzed cyanation.

4-TolBr + 2 eq. NC-CH2-CN → 4-TolCN

Conditions: 10% DMENiBr$_2$, 20% Bpy, 2 eq. DBU, 0.1M TBAPF$_6$, DMA, 80° C., 4 h, AC (sqw, 2 Hz, 2.8 V)

| Deviations from conditions above | Yield of ArCN |
|---|---|
| None | 42% |
| No base | — |
| Reductive conditions (Zn(+)), no base, 3 h | 10% |
| RT | 5% |

Example 6

Electrochemical Studies

General Information and Procedure for the Electrochemical Studies

All electrochemical analytical experiments were carried out using a CH Instruments 600E Potentiostat/Galvanostat. All potentials are reported relative to a nonaqueous silver electrode (Ag$^+$/Ag, NSE) that was used as a reference electrode (10 mM AgNO$_3$ in 0.1M TBAPF$_6$ acetonitrile solution); the measured potential of the Fc$^+$/Fc couple (in 0.1M TBAPF$_6$, MeCN) was equal to 0.088 V. The same glass cell as described in the "Cell set-up" section was used; the teflon cap in this case had three large (for the working, counter, and reference electrodes) and two small holes (the Ar inlet and outlet).

In a typical experiment, 4 ml of the examined solution were transferred to the cell, the teflon cap equipped with electrodes was placed, and then argon was bubbled through the solution for at least 5 minutes with moderate stirring. Then, a mild flow of argon was adjusted above the solution level, stirring was terminated (unless otherwise noted), and the electrodes were connected to the potentiostat in order to start the experiment.

Measurements of the Capacitance of an Electrolyte Double Layer

FIG. 8 is a CV curve recorded for 0.2M LiBr in DMF (GC rods were used as working and counter electrodes: scan rate—6 V/s, 10 cycles). The capacitance of the electrochemical cell equipped with GC rod electrodes and filled with 0.2M LiBr DMF solution can be calculated as C=S/(2·ΔV·r), where C—capacitance, S—the inner area of the I/V plot, ΔV—the voltage range, r—the scan rate. The calculation results in a value of about 50 F for our cell and electrolyte.

Cyclic Voltammetry Studies

Figure 4A:
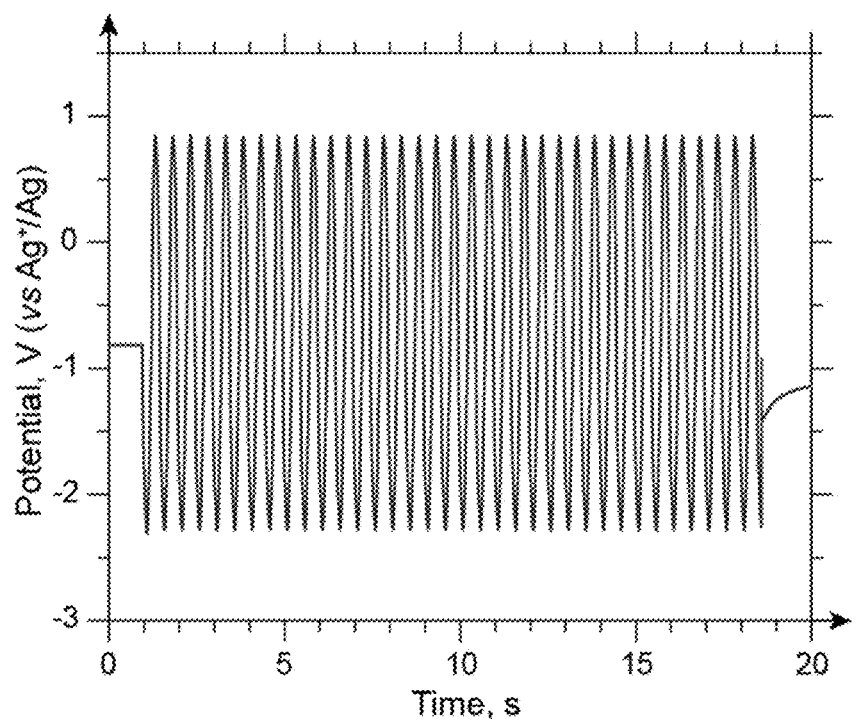
Figure 4B:
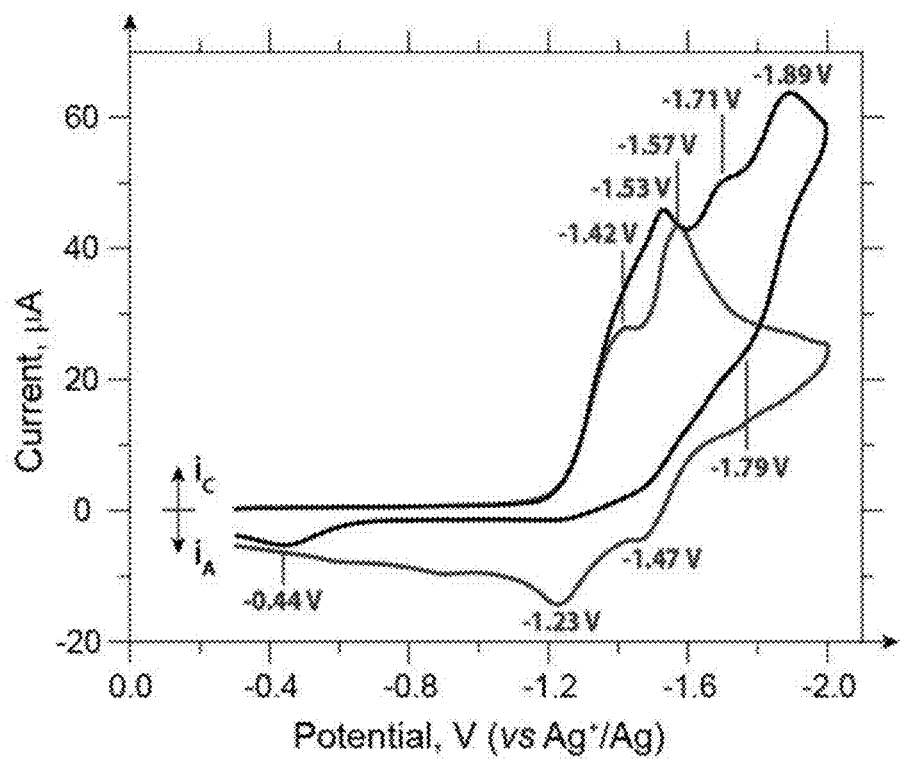

CV study of the $NiBr_2$·DME and Bipy mixture with the addition of 4-bromobenzotrifluoride (FIG. 4B)

A DMA solution, containing 0.1M $TBAPF_6$, 2 mM $NiBr_2$·DME, and 2 mM Bipy was prepared as described in "General information and procedure for electrochemical studies". A glassy carbon working electrode was used (disk, d=1 mm) and a platinum wire counter electrode. The potential of the working electrode was changed to a −0.3, −2, −0.3 V sequence (scan rate—0.25V/s; no stirring). After the addition of 2 mM of 4-bromobenzotrifluoride to the mixture, the second CV experiment was conducted with the same parameters.

Open Circuit Potential (OCP) Experiments
Amination

A 0.2M LiBr DMA solution, containing 5 mM $NiBr_2$·DME, 7.5 mM di-$^t$BuBipy, 50 mM 4-bromobenzotrifluoride, and 150 mM Morpholine was prepared as described in "General information and procedure for electrochemical studies". Two glassy carbon rod electrodes (which are typically used in regular AC-assisted experiments) served as the working and counter electrodes, together with an $Ag^+$/Ag reference electrode. The electric circuit was assembled as described in the "Set-up preparation" section; the stirring rate of the solution was set to 1400 rpm. Alternating voltage was applied to the GC rod electrodes by the function generator (sine waveform, 2 Hz) and adjusted to a value of 3V for peak voltage. The potential between one of the GC rods and the $Ag^+$/Ag reference electrodes was measured continuously using the potentiostat (with the "open circuit potential" technique). The resulting data can be found in FIG. 4A and in the description herein.

Etherification

A 0.2M LiBr DMF solution, containing 5 mM $NiBr_2$·DME, 5 mM Bipy, 50 mM 4-bromobenzotrifluoride, 150 mM n-Hexanol, and 50 mM Quinuclidine was prepared as described in "General information and procedure for electrochemical studies". The following procedure is identical to the one described in "Open circuit potential (OCP) experiments: Amination" section (stirring rate—200 rpm).

Esterification

A 0.1M $TBAPF_6$ DMA solution containing 5 mM $NiBr_2$·DME, 5 mM Bipy, 50 mM 4-bromobenzotrifluoride, 75 mM Boc-L-ProOH, and a 3 eq. $K_2CO_3$ suspension was prepared as described in "General information and procedure for electrochemical studies". The following procedure is identical to the one described in the "Open circuit potential (OCP) experiments: Amination" section (stirring rate—200 rpm).

Example 7

Electrochemical Studies-Cell Design with Large Electrode Size

Introduction

Organic electrochemistry is known to be a convenient method for the synthesis of a wide spectrum of compounds; at the same time, for practical and industrial needs a simple and effective designs of the electrochemical reactors are required, which should be suitable to carry out the reactions of interest effectively and reproducibly. Batch reactors with rod-/plate-like electrodes are the simplest option for electrochemistry. However, problems related to low surface area of the electrodes and mass transfer start to arise with the increase in loading and therefore, size of the electrochemical reactor. The use of electrodes in the form of foam or sponge (e.g. RVC electrodes) allows to increase the effective surface of the electrodes. However, it does not handle the issue of mass transfer which may be a crucial point for reactions where both anodic and cathodic processes are involved in the formation of product. Flow systems possess evident advantages as solution to both problems. However, they suffer from increased complexity of the system. Mostly, construction of such reactors can hardly be achieved in laboratories without qualified engineering support. Moreover, in some cases, some specific hardware parameters of the reactor, such as the distance between the electrodes, may have crucial impact on the results, and therefore, should be additionally adjusted from one experiment to another.

A design which will allow both high effective surface area of the electrodes, and a solution for the problem of mass transfer of reagents and intermediates is required. A design that at the same time, will be user-friendly and easy-to-construct even for the beginner scientist. Such design is currently one of the main goals of electrochemical engineering.

This example provides in one embodiment, a solution to the problems described herein above. The solution is provided using non-classical approaches for performance of the electrochemical process. Particularly, as was shown herein, alternating current (AC) instead of direct current (DC) was implemented for processes where both oxidation and reduction are important for product formation. In the case of synthesis of phenol from benzene, mixed disulfides and trifluoromethylated arenes, use of AC demonstrated better results when compared with experiments conducted under DC. As demonstrated herein above, AC is successfully implemented into the transition-metal catalysis. Thus for example, in nickel-catalyzed amination, etherification and esterification, the initial reduction of the metal catalyst facilitates the oxidative addition of the aryl halide, while reductive elimination of the product may be enabled by the following oxidation of the metal complex at the same electrode with "inverted" polarity. Clearly, such approach eliminates the need for mass transfer between the electrodes with the following benefits in conversion of reagents and selectivity of the process. Therefore, it is herein considered that the use of AC allows to completely resolve the issue of the mass transfer of reagents and intermediates in batch reactors for redox-neutral processes.

While the problem of mass transfer between the electrodes disappears with high enough frequency values, mass transfer from the bulk solution to the surface of the electrodes is still an obstacle. In this example, it is shown that the problem of mass transfer from the bulk solution to the surface of the electrodes is solved or reduced when the volume (size) of the (e.g. RVC) electrodes fill the whole or most of the volume of the solution. For example and in one embodiment, mass transfer from the bulk solution to the surface of the electrodes may occur by means of diffusion if the volume of the (e.g. RVC) electrodes fill the whole or most of the volume of the solution. Thus, such design eliminates the need of stirring throughout the electrolytic process. This is convenient for example when using fragile foam-like electrodes (like RVC) and provides higher surface area of the electrodes; at the same time, alternation of the electrode connections to the function generator may help to increase current and consequently the rate of electrolysis due to the lower resistance arising from closer contact of the electrodes (FIG. 18).

Accordingly, in this example and in one embodiment, effectiveness and applicability of alternating current in the conditions of the RVC-filled batch reactor was demonstrated with examples of selected electrochemical reactions, reported herein with use of AC- and/or DC-electrolysis.

Experiments

In order to provide initial validation for the concept of AC-enabled batch reactor with large volume electrodes, preliminary studies were conducted using small-scale set-up with two half-rounded RVC electrodes (20 ppi) (app. 3×2×1 cm (in the widest part)) as electrodes with paper tissue or thin pieces of glass slide as separator between them in order to prevent short circuit in the system. Ni-catalyzed amination of aryl bromides—in particular, reaction between 4-bromobenzotrifluoride and morpholine—shown in examples herein above, was chosen as the model reaction for the demonstration.

As shown on FIGS. 19A-19C, the reaction went smoothly on 0.2 mmol scale (4-bromobenzotrifluoride) allowing more than 90% of NMR yield in 4 hours of the reaction. Being a typical example of Ni-catalyzed cross-coupling, amination is practically and mechanistically similar to other analogous reaction of C-Heteroatom cross-coupling as etherification and esterification; thus, similar effectiveness of our set-up is expected for all such and similar reactions.

The next experiment was conducted on the example of the same reaction but using larger set-up. Here, a pair of 4×4×1 cm RVC electrodes were utilized, separated by paper tissue in a self-made glass cell with rectangular profile (FIGS. 20A-20B). This allowed to increase the loading of reagents by five times (1 mmol), keeping the same concentrations at the same time. After 4 hours of AC electrolysis with the conditions used in the previous experiment, the NMR yield of the product (aromatic amine) was found to be 92%. This experiment shows clearly that the suggested design of batched reactor demonstrated stable and reproducible results both in case of small-scale and scaled-up electro-synthetic reactions.

The effectiveness of the proposed concept of AC-enabled batch reactor on even larger scales with loadings of initial reagents up to 10 grams can be demonstrated. For example and in one embodiment, four 10×10×1 cm RVC electrodes are used as electrodes in a scaled-up batch reactor. Alternating the connections of the electrode (as depicted in FIG. 18) helps to reduce the resistance between the electrodes allowing more uniform conversion of the initial species throughout the entire solution. In one embodiment, the scope of at least 4 or 5 different redox-neutral reactions is proposed for the demonstration of the set-up including reactions of dehydroxylative cross-coupling of alcohols with aryl halides, decarboxylative couplings, arylation of benzylic C—H bonds and N-acylation amide synthesis. In addition, high performance of the set-up for the net oxidation and reduction electrolysis is proposed.

The cell configuration and components provide the following advantages in one embodiment:
1. Convenient pathway to conduct large scale electrolysis by eliminating the problem of mass transfer of redox-active species between the electrodes: the combination of AC-electrolysis together with sponge- or net-like electrodes (e.g. RVC) allows localization of oxidation and reduction processes on the surface of both electrodes simultaneously while the transfer of reagents to the surface of the electrodes may successfully occur by means of diffusion. No need for stirring of the solution.
2. AC-enabled batch reactor possesses all the advantages of the use of AC over DC in electrolysis for redox-neutral processes: the absence of the need for mass transfer of the redox-active species from one electrode to another and avoiding strongly reducing and oxidizing environment allows to achieve higher selectivity for desirable processes. The parameters of frequency and waveform, added with AC, allow to get more control over the course of the reaction and the composition of the products.

Example 8

Mechanistic Studies

To better understand the basic mechanistic features of AC-assisted nickel-catalyzed cross-couplings, electrochemical studies of the reactions of this invention were performed. First, the potentials of the electrodes (the glassy carbon rods) were measured relatively to standard nonaqueous silver electrode (NSE, $Ag^+/Ag$) in typical amination, etherification, and esterification experiments. As FIG. 4A shows, the potential changes from 0.8 to −2.2 V (vs NSE) in the amination reaction. This interval remains the same for the etherification (FIG. 9). However, for esterification, it is shifted to slightly higher potentials because of the absence of $Br^-$ in the electrolyte (FIG. 10). To better understand what electrochemical processes occur at these potentials in the reactions under investigation, cyclic voltammetry (CV) studies were performed (see for example FIG. 4B). The voltammogram of $Ni(DME)Br_2$ (2 mM) and Bipy (2 mM) showed two partially separated quasi-reversible reduction waves with peaks at −1.42 and −1.57 V (FIG. 4B).

The coulometric studies and the combination of the chronoamperometry and microelectrode voltammetry of $[Ni(Bipy)_3]^{2+}$ complexes as well as a comparison of voltammograms for $[Ni(Bipy)_3]^{2+}$ and $Ni(Bipy)Br_2$ strongly indicate that these waves represent the sequential reduction of Ni(II) to Ni(0) through a Ni(I) intermediate. When Compound 3 (2 mM) was added to a solution of $Ni(Bipy)Br_2$, the original reduction waves could still be detected, but they became less resolved and fully irreversible. Two new reduction waves appeared with peak potentials of −1.71 and −1.89 V. It is hypothesized that oxidative addition occurs after the reduction of nickel to a zero oxidation state, making the reduction waves irreversible, and that these additional waves (−1.71 and −1.89 V) correspond to the sequential reduction of the [NiL(Ar)Br] species. Nevertheless, the voltammetry under conditions as close as possible to the synthetic experiments (GC rods as working and counter electrodes, scan rate of 24 V/s, and the concentrations of reagents as in synthesis) indicated that in synthetic experiments the reduction of the [NiL(Ar)Br] species might be less significant than in analytical CV because of the higher surface area of the electrode, the higher concentration of nickel ions, and the higher scan rate.

These data imply that NiL(Ar)Br is the most probable species to undergo further transmetallation and oxidation to afford the product of cross-coupling (FIG. 1D). The anodic area of the CV curves of the amination and etherification reaction mixtures is dominated by the oxidation of Br.

Therefore, $Br_3^-$ and $Br_2$ are probably mediators of the electrochemical oxidation of nickel species in these experiments.

Figure 4C:
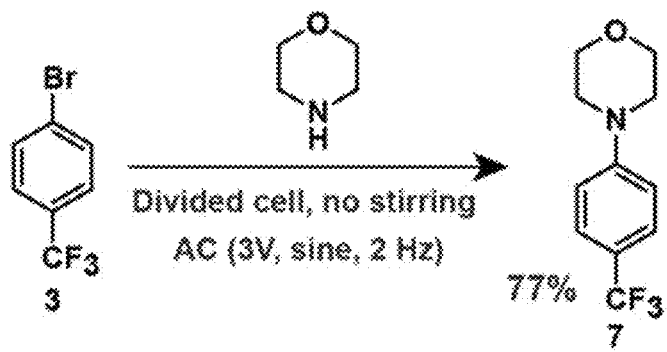
Figure 4D:
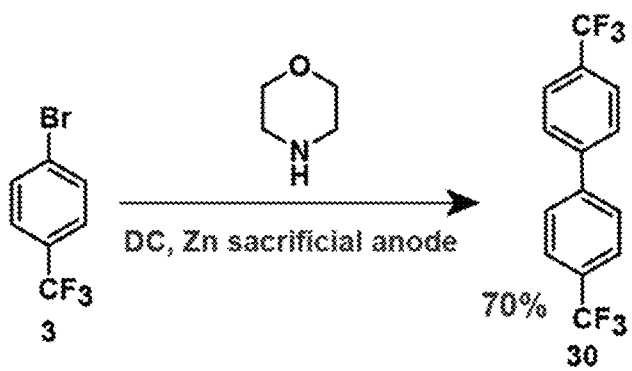
Figure 4E:
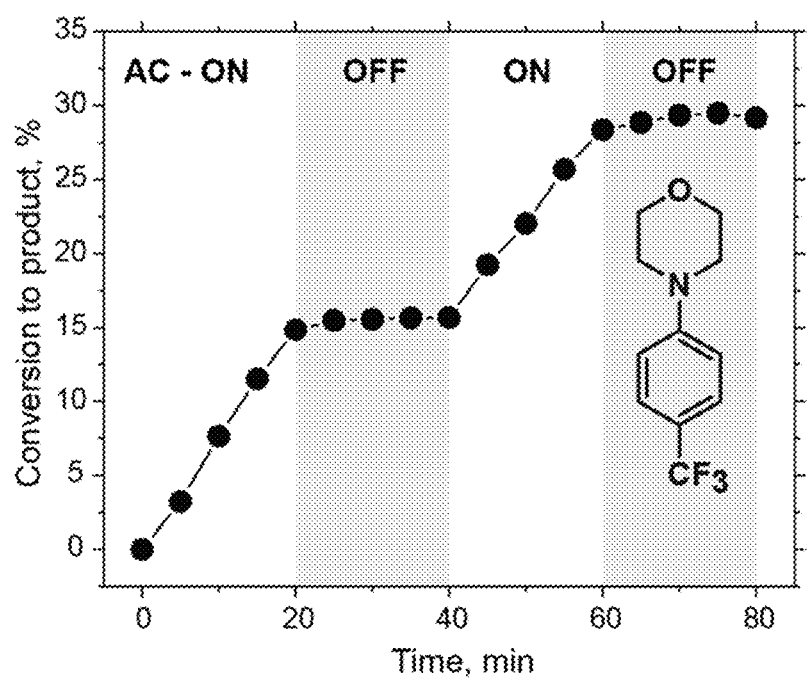

To confirm that processes at one electrode are sufficient to perform the reactions, the AC-assisted reaction between 3 and morpholine was conducted in a divided cell without stirring (FIG. 4C). This experiment resulted in a 77% yield, confirming that the transfer of intermediates between electrodes is unnecessary for this reaction to proceed. To probe the possibility that only the reduction phase of the AC cycle is essential for the coupling, DC amination and etherification of 3 was performed with a Zn sacrificial anode and set the potential of the GC cathode equal to the peak negative potential in AC experiments (−2.2 V vs NSE) (FIG. 4D). Both experiments resulted in the formation of the biaryl product (30) with 60-70% yields and only minor quantities (2-8%) of the coupling products 7 and 5, thus indicating the essential role of the oxidation phase of the AC cycle in forming the coupling products. To probe the role of the catalysis by Ni(I) species in bulk solution, kinetic experiments with the ON/OFF cycles of AC were performed (FIG. 4E, FIG. 13). The kinetics of the amination reaction between 3 and morpholine indicates that the reaction stops almost immediately when AC is OFF and starts again when AC is ON, demonstrating that the contribution of the self-sustainable Ni(III)/Ni(I) cycle to the formation of 7 is insignificant.

Overall, these demonstrated mechanistic studies are consistent with the proposal in FIG. 1D. Most likely, the catalytic cycle is initiated by the reduction of Ni(II), which is abundant in the solution, to the Ni(0) species, which undergo oxidative addition. During the low-voltage phase, when neither oxidation nor reduction processes are expected, the oxidative addition product undergoes transmetallation. The oxidation of the transmetallated product to a Ni(III) state favors reductive elimination, which would furnish the desired coupling product and release Ni(I) species. There are at least two ways by which Ni(I) could be reduced to Ni(0): (i) direct reduction at the electrode, and (ii) reversible disproportionation to Ni(II) and Ni(0) with the subsequent reduction of Ni(II) to Ni(0) at the electrode.

Amination in a Divided Cell (FIG. 4C)

A divided handmade cell was assembled using the glass cell described in "Cell set-up" section; a glass paper filter and polydimethylsiloxane (PDMS) were used as the binding and sealing agent (FIG. 11, FIG. 4C). This set-up provided a large surface area of the membrane, avoiding high resistance between the compartments.

Next, 2 ml of the 0.2M LiBr DMA solution containing 5 mM NiBr$_2$·DME, 7.5 mM di-$^t$BuBipy, 50 mM 4-bromobenzotrifluoride, and 150 mM Morpholine were transferred to each of the compartments of the divided cell. The cap, equipped with two glassy carbon rod electrodes, was attached so that the electrodes were in different compartments. A weak argon flow was set in the cell to be above the level of the solution, and no stirring was applied. The electric circuit was assembled as described in the "Set-up preparation" section. Alternating voltage was applied to the GC rod electrodes and adjusted to a value of 3 V for peak voltage. Electrolysis was conducted for 4 hours. Thereafter, 0.5 ml of the solution from each of the compartments was transferred to a screw-capped vial, mixed with a small amount of Na$_2$H2EDTA water solution, diluted with an aqueous solution of K$_2$CO$_3$ (0.1 M), and extracted with a Pentane/Et$_2$O (1/1 ratio) mixture. The extracts were dried over Na$_2$SO$_4$; the solvent was evaporated carefully under vacuum. Then, the residues were used to determine the NMR yield of the experiment. The NMR yield of the amination product, 4-(4-(trifluoromethyl)phenyl)morpholine, amounted to 60% and 77% for each of the compartments (the noticeable difference in yields is probably due to a small inequality of compartment volumes).

DC-Assisted Amination and Etherification with a Zn Sacrificial Anode

Amination (FIG. 4D).

A 0.2M LiBr DMA solution containing 5 mM NiBr$_2$·DME, 7.5 mM di-$^t$BuBipy, 50 mM 4-bromobenzotrifluoride, and 150 mM Morpholine was prepared as described in "General information and procedure for electrochemical studies". A teflon cap equipped with a glassy carbon electrode, a zinc rod electrode, and an Ag$^+$/Ag reference electrode was attached. The solution was bubbled with argon for at least 5 minutes with moderate stirring; then, a mild argon flow was set in the cell to be above the level of the solution and the stirring rate was changed to 1400 rpm. A potentiostat was used to apply voltage to the system. One GC rod electrode served as a working electrode, whereas the zinc rod served as a counter electrode. The electrolysis was conducted for 4 hours at a constant potential of the GC rod electrode set to −2.2V (vs Ag$^+$/Ag). Thereafter, 0.5 ml of the solution was transferred to a screw-capped vial, mixed with a small amount of Na$_2$H2EDTA water solution, diluted with aqueous solution of K$_2$CO$_3$ (0.1 M), and extracted with a Pentane/Et$_2$O (1/1 ratio) mixture. The extract was dried over Na$_2$SO$_4$, and the solvent was evaporated carefully under vacuum. Then, the residue was used to determine the NMR yield of the experiment. Biaryl product (4,4'-bis(trifluoromethyl)-1,1'-biphenyl) was the major product in the reaction with an NMR yield of 63%; the NMR yield of 4-(4-(trifluoromethyl)phenyl)morpholine was 2%.

Etherification (FIG. 12)

A 0.2M LiBr DMF solution containing 5 mM NiBr$_2$·DME, 5 mM Bipy, 50 mM 4-bromobenzotrifluoride, 150 mM n-Hexanol, and 50 mM Quinuclidine was prepared as described in "General information and procedure for electrochemical studies". The following procedure is similar to the one described in "DC-assisted electrolysis with a Zn sacrificial anode: Amination" section. Biaryl product (4,4'-bis(trifluoromethyl)-1,1'-biphenyl) was the major product in the reaction, with an NMR yield of 73%; the NMR yield of 1-(hexyloxy)-4-(trifluoromethyl)benzene was 8%.

Kinetic Experiments with ON/OFF Cycles of AC

Amination (FIG. 4E)

A 0.2M LiBr DMA solution containing 5 mM NiBr$_2$·DME, 7.5 mM Bipy, 50 mM 4-bromobenzotrifluoride, and 150 mM Morpholine was prepared as described in "General procedure for amination experiments". The electric circuit was assembled as described in the "Set-up preparation" section. The electrolysis (sine waveform, 2 Hz, and 3V peak voltage) was conducted for 20 minutes, then stopped for 20 minutes, then again continued for 20 minutes, and again stopped for 20 minutes (the total duration of the experiment is 80 minutes). During the experiment, 30 μL samples of the solution were taken every 5 minutes with a syringe, diluted with 1 ml of acetonitrile, filtered through a glass paper filter, and analyzed by HPLC. The conversion at each time point was determined from the ratio of the integrals for the peaks (PDA detector) of the starting material (4-bromobenzotrifluoride), and the product (4-(4-(trifluoromethyl)phenyl)morpholine), while considering the different sensitivity of the PDA detector to these compounds. The difference in sensitivity of the PDA detector to 4-bromobenzotrifluoride and 4-(4-(trifluoromethyl)phenyl)morpholine was determined from a reference chromatogram of a 1:1 mixture of these compounds.

Etherification (FIG. 13)

A 0.2M LiBr DMF solution containing 5 mM NiBr$_2$·DME, 5 mM Bipy, 50 mM 4-bromobenzotrifluoride, 150 mM n-Hexanol, and 100 mM Quinuclidine was prepared as described in "General procedure for etherification experiments". The electric circuit was assembled as described in the "Set-up preparation" section. The electrolysis (sine waveform, 10 Hz, and 3V peak voltage) was conducted for 40 minutes, then stopped for 40 minutes, then again continued for 40 minutes, and again stopped for 40 minutes (the total duration of the experiment is 160 minutes). During the experiment, 30 μL samples of the solution were taken every 10 minutes with a syringe, diluted with 1 ml of acetonitrile, filtered through a glass paper filter, and analyzed by HPLC. The conversion at each time point was determined from the ratio of the integrals for the peaks (PDA detector) of the starting material (4-bromobenzotrifluoride), and the product (1-(hexyloxy)-4-(trifluoromethyl)benzene), while considering the different sensitivity of the PDA detector to these compounds. The difference in the sensitivity of the PDA detector to 4-bromobenzotrifluoride and to 1-(hexyloxy)-4-(trifluoromethyl)benzene was determined from a reference chromatogram of a 1:1 mixture of these compounds.

Esterification (FIG. 14)

A 0.1M TBAPF$_6$ DMA solution containing 5 mM NiBr$_2$·DME, 5 mM Bipy, 50 mM 4-bromobenzotrifluoride (3), 75 mM benzoic acid, and 10 equiv. K$_2$CO$_3$ suspension was prepared as described in "General procedure for the esterification experiments". The electric circuit was assembled as described in the "Set-up preparation" section. The electrolysis (sine waveform, 2 Hz, and 3V peak voltage) was conducted for 40 minutes, then stopped for 40 minutes, then again continued for 40 minutes, and again stopped for 40 minutes (the total duration of the experiment is 160 minutes). During the experiment, 30 μL samples of the solution were taken every 10 minutes with a syringe, diluted with 1 ml of acetonitrile, filtered through a glass paper filter, and analyzed by HPLC. The conversion at each time point was determined from the ratio of the integrals for the peaks (PDA detector) of the starting material (4-bromobenzotrifluoride, 3), and the product (4-(trifluoromethyl)phenyl benzoate, 18), while considering the different sensitivity of the PDA detector to these compounds. The difference in the sensitivity of the PDA detector to 4-bromobenzotrifluoride (3) and 4-(trifluoromethyl)phenyl benzoate (18) was determined from a reference chromatogram of a 1:1 mixture of these compounds.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A catalytic coupling process, the process comprises reacting at least one functional group A with at least one functional group B in the presence of a transition metal as a catalyst under AC voltage; wherein the reaction between the functional group A and the functional group B is intermolecular or intramolecular resulting in a C—N, C—O, C—S, C—P, C—Si, C—B or combination thereof coupling product, wherein the process is conducted in an electrochemical cell, wherein the cell comprises:
    a first electrode, a second electrode and an electrolyte;
    wherein the transition-metal catalyst is dissolved in said electrolyte; and
    wherein by applying the AC voltage between said first electrode and said second electrode sequential oxidation and reduction of said transition metal occur and thereby inducing a coupling reaction between at least one functional group A and at least one functional group B.

2. The process of claim 1, wherein the at least one functional group A is a functional group of a first compound and the at least one functional group B is a functional group of a second compound, and the coupling reaction is intermolecular.

3. The process of claim 2, wherein the first compound comprises two or more functional groups A and the second compound comprises two or more functional groups B, and the coupling reaction will form a polymerized coupling product.

4. The process of claim 2, wherein said first compound comprises at least one functional group A is an aromatic halide and the second compound comprises at least one functional group B is a nucleophile.

5. The process of claim 4, wherein the nucleophile comprises R—OH, R—NH$_2$, R—NH—R$^1$, R—COOH, N$_3^-$, CN$^-$, R—SH, R—C(O)NH—R$^1$, R—PH—R$^1$, (RO)—P(O) H—(OR$^1$), R—P(O) H—(OR$^1$), HSi—(R)$_3$, HB—(OR)$_2$, HB—(R)$_2$ (OR)$_2$—B—B—(OR)$_2$, wherein R is H, substituted or unsubstituted alky, aryl, heteroaryl, cycloalkyl or heterocycloalkyl; R$^1$ is H, substituted or unsubstituted alky, aryl, heteroaryl, cycloalkyl or heterocycloalkyl; or R and R$^1$ form together a cyclic 5-6 membered ring.

6. The process of claim 1, wherein the functional group A and the functional group B is of a third compound, and the coupling product is intramolecular.

7. The process of claim 1, wherein:
    at least one oxidation process and at least one reduction process of said transition metal catalyst occur by electron transfer to or from said first electrode;
    at least one oxidation process and at least one reduction process of said transition metal catalyst occur by electron transfer to or from said second electrode; or
    a combination thereof.

8. The process of claim 1, wherein the transition metal catalyst comprises Ni(II), Ru(II, III), Cu(I, II), Co(II, III), Fe(II, III), Cr(II, III, VI), V(II, III, IV, V), Ti(IV), Mo(III, IV, V, VI) or any combination thereof.

9. The process of claim 8, wherein the transition metal catalyst is a complex comprising a transition metal and a ligand, wherein the ligand comprises nitrogen-based ligands, phosphorus-based ligands or combination thereof.

10. The process of claim 9, wherein the nitrogen-based ligands comprise a bipyridyl group, di-$^t$BuBipy, pyridine, 1,10-phenanthroline, 4,7-Diphenyl-1,10-phenanthroline or combination thereof, or wherein the phosphorus-based ligands comprise 1,2-Bis (diphenylphosphino) ethane (dppe), triphenylphosphine, tricyclohexylphosphine, 2,2'-bis (diphenylphosphino)-1,1'-binaphthyl (BINAP), 2-dicyclohexylphosphino-2',6'-dimethoxybiphenyl (SPhos) or combination thereof.

11. The process of claim 1, wherein the C-N coupling comprises an amination reaction.

12. The process of claim 1, wherein the C-O coupling comprises an esterification and etherification reactions.

13. The process of claim 1, wherein the process is a catalytic process and comprises reductive elimination and oxidative addition of the transition metal intermediates within the catalytic cycle.

14. The process of claim 1, wherein the concentration of the transition-metal in the electrolyte ranges between 0.1 to 20 mol % of catalyst vs. at least one functional group A, and at least one functional group B.

15. The process of claim 1, wherein the electrolyte comprises an organic solvent.

16. The process of claim 15, wherein the organic solvent is selected from the group consisting of dimethylformamide (DMF) and/or dimethylacetamide (DMA), and LiBr and/or $NBu_4PF_6$.

17. The process of claim 1, wherein the first electrode and second electrode comprise glassy carbon rod, foam, plate or porous electrode, or wherein the first electrode and second electrode comprise carbon, Ag, Pt, Au, W, Pb, Ti, Ni, Co or stainless steel.

18. The process of claim 1, wherein the frequency of the applied voltage ranges between 0.5 Hz and 100 Hz and the amplitude of the applied AC voltage is at least 1V, or wherein the yield of the process is at least 50%, or at least 60% or at least 75%, or at least 80%, or wherein the amount of side-products formed is less than 5%.

* * * * *